US010696132B2

(12) United States Patent
Inui et al.

(10) Patent No.: US 10,696,132 B2
(45) Date of Patent: Jun. 30, 2020

(54) AIR-CONDITIONING CONTROL SYSTEM AND INFORMATION PROCESSING DEVICE

(71) Applicant: Toyota Jidosha Kabushiki Kaisha, Toyota-shi, Aichi-ken (JP)

(72) Inventors: Maya Inui, Toyota (JP); Masahiro Shoji, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 395 days.

(21) Appl. No.: 15/637,387

(22) Filed: Jun. 29, 2017

(65) Prior Publication Data
US 2018/0009290 A1    Jan. 11, 2018

(30) Foreign Application Priority Data
Jul. 5, 2016  (JP) .................................. 2016-133204

(51) Int. Cl.
*B60H 1/00* (2006.01)
*F25B 49/02* (2006.01)
(Continued)

(52) U.S. Cl.
CPC ..... *B60H 1/00785* (2013.01); *B60H 1/00742* (2013.01); *B60H 1/00778* (2013.01);
(Continued)

(58) Field of Classification Search
CPC ........................ B60H 1/00785; B60H 1/00742
(Continued)

(56) References Cited

U.S. PATENT DOCUMENTS

| 2009/0150024 A1* | 6/2009 | Kojima .............. B60H 1/00642 701/36 |
| 2013/0092364 A1* | 4/2013 | Kumar .............. B60H 1/00742 165/237 |

(Continued)

FOREIGN PATENT DOCUMENTS

| JP | 2009-139231 A | 6/2009 |
| JP | 2010-100096 A | 5/2010 |

(Continued)

OTHER PUBLICATIONS

U.S. Appl. No. 15/625,279, filed Jun. 16, 2017 Inventors: Maya Inui, Kunihiko Jinno, Kan Saitou.

*Primary Examiner* — Vivek K Shirsat
*Assistant Examiner* — Ko-Wei Lin
(74) *Attorney, Agent, or Firm* — Dinsmore & Shohl LLP

(57) ABSTRACT

An air-conditioning control system includes an air-conditioning device mounted in a host vehicle, a determination unit mounted in the host vehicle or a server and configured to determine whether a boarding position at which a boarding event in which an occupant boards the host vehicle occurs is a point with a predetermined attribute, and a control unit mounted in the host vehicle and configured to control the air-conditioning device based on a determination result from the determination unit. The control unit sets a ventilation capacity of the air-conditioning device to be greater when the determination unit determines that the boarding position is a point with the predetermined attribute than when the determination unit does not determine that the boarding position is a point with the predetermined attribute.

16 Claims, 13 Drawing Sheets

(51) Int. Cl.
*B60H 1/32* (2006.01)
*F01P 11/20* (2006.01)
*F24F 3/153* (2006.01)
*F25B 47/00* (2006.01)

(52) U.S. Cl.
CPC ..... *B60H 1/00828* (2013.01); *B60H 1/00849* (2013.01); *B60H 1/00878* (2013.01); *B60H 1/3207* (2013.01); *F01P 11/20* (2013.01); *F24F 3/153* (2013.01); *F25B 47/006* (2013.01); *F25B 49/02* (2013.01)

(58) Field of Classification Search
USPC .................................................. 454/69–162
See application file for complete search history.

(56) References Cited

U.S. PATENT DOCUMENTS

| | | | |
|---|---|---|---|
| 2015/0053370 A1* | 2/2015 | Kikuchi | B60H 1/00778 165/11.1 |
| 2015/0099443 A1* | 4/2015 | Hirabayashi | B60H 1/00657 454/75 |

FOREIGN PATENT DOCUMENTS

| | | | | |
|---|---|---|---|---|
| JP | 2011-068157 | A | 4/2011 | |
| JP | 2014-020650 | A | 2/2014 | |
| JP | 2014-043212 | A | 3/2014 | |
| JP | 2014-046700 | A | 3/2014 | |
| WO | WO-2016070047 | A1 * | 5/2016 | ............... B60N 2/56 |

\* cited by examiner

| NUMBER OF OCCUPANTS | ABSOLUTE HUMIDITY [g/kg] |
|---|---|
| ONE | 2.0 |
| TWO | 4.0 |
| THREE OR MORE | 6.0 |

FIG. 11A

| TERMINAL ID | TRAVEL DATE AND TIME | TRAVELING SPEED | LINK ID | DEFROSTER |
|---|---|---|---|---|
| 00001 | ** | ** | ** | OFF |
| 00001 | ** | ** | ** | ON |
| ⋮ | ⋮ | ⋮ | ⋮ | ⋮ |
| 00002 | ** | ** | ** | ON |

TRAVEL INFORMATION ID=j

FIG. 11B

| TERMINAL ID | TRAVEL INFORMATION ID | START ON/OFF DATE AND TIME | HOST VEHICLE POSITION (LATITUDE, LONGITUDE) |
|---|---|---|---|
| 00001 | ** | ** | ** |
| 00001 | ** | ** | ** |
| ⋮ | ⋮ | ⋮ | ⋮ |
| 00002 | ** | ** | ** |

AIR-CONDITIONING CONTROL SYSTEM AND INFORMATION PROCESSING DEVICE

CROSS-REFERENCE TO RELATED APPLICATIONS

This application claims priority to Japanese Patent Application No. 2016-133204 filed on Jul. 5, 2016 which is incorporated herein by reference in its entirety including the specification, drawings and abstract.

BACKGROUND

1. Technical Field

The disclosure relates to an air-conditioning control system and an information processing device.

2. Description of Related Art

A technique of promoting use of a defroster in a host vehicle before the host vehicle reaches a point at which a defroster is being used in another vehicle based on information on a use state of the defroster in another vehicle on a predicted route of the host vehicle during travel is known (for example, see Japanese Patent Application Publication No. 2014-043212 (JP 2014-043212 A)).

SUMMARY

However, in the above-mentioned technique, it may be difficult to increase a ventilation capacity of an air-conditioning device depending on an attribute of a boarding position which is a position of the host vehicle when a boarding event in which an occupant boards the host vehicle occurs. Depending on attributes of the boarding position, an amount of water vapor generated (an amount of moisture evaporating by respiration and perspiration) from the occupant may increase significantly. For example, when the boarding position is a point at which a sports facility is present, there is a high likelihood that the occupant has performed a motion having relatively high motion intensity (a high-load motion) before boarding the host vehicle and thus there is a high likelihood that the amount of water vapor generated from the occupant after boarding the host vehicle will be relatively great.

Therefore, the disclosure provides an air-conditioning control system and an information processing device that can increase a ventilation capacity of an air-conditioning device depending on attributes of a boarding position.

A first aspect of the disclosure relates to an air-conditioning control system mounted in a vehicle. The air-conditioning system includes: an air-conditioning device configured to adjust a ventilation capacity; and an electronic control unit configured to detect a boarding event in which an occupant boards the vehicle based on an event in which a start switch of the vehicle is turned on, and determine whether a boarding position which is the position of the vehicle when the boarding event is detected is a point with a predetermined attribute, wherein the electronic control unit performs control such that the ventilation capacity of the air-conditioning device is set to be greater when it is determined that the boarding position is a point with the predetermined attribute than when it is not determined that the boarding position is a point with the predetermined attribute.

A first aspect of the disclosure relates to an air-conditioning control system. The air-conditioning control system includes: an air-conditioning device mounted in a vehicle and configured to adjust a ventilation capacity; an electronic control unit mounted in the vehicle and configured to control the air-conditioning device; and an information processing device disposed remotely from the vehicle and configured to detect a boarding event in which an occupant boards the vehicle based on an event in which a start switch of the vehicle is turned on, determine whether a boarding position which is the position of the vehicle when the boarding event is detected is a point with a predetermined attribute, and transmit a predetermined signal when the boarding event is detected and it is determined that the boarding position is a point with the predetermined attribute, wherein the electronic control unit performs control such that the ventilation capacity of the air-conditioning device is set to be greater when the predetermined signal is received than when the predetermined signal is not received.

According to this air-conditioning control systems, when it is determined that the boarding position when the boarding event in which the occupant boards the vehicle is detected is a point with a predetermined attribute, it is possible to increase the ventilation capacity of the air-conditioning device, in comparison with a case in which it is determined otherwise. Accordingly, it is possible to increase the ventilation capacity of the air-conditioning device depending on an attribute of a boarding position.

With regard to above aspects of the disclosure, the electronic control unit or information processing device may determine whether the boarding position is a point with the predetermined attribute based on POI information. Accordingly, it is possible to determine whether the boarding position is a point with the predetermined attribute based on the POI information which generally has a high likelihood of use.

With regard to above aspects of the disclosure, the point with the predetermined attribute may be a point at which at least one of a sports facility and a bathing facility is present. Accordingly, since there is a high likelihood that an amount of water vapor generated from the occupant when the occupant has used the sports facility or the bathing facility will be relatively great, it is possible to set the ventilation capacity of the air-conditioning device at the time of the boarding even at a point at which such facility is present.

With regard to above aspects of the disclosure, the point with the predetermined attribute may be a point at which at least one of a sports facility and a bathing facility is present, and the electronic control unit or information processing device may determine whether the boarding position is the point at which at least one of a sports facility and a bathing facility is present based on parking history information of the vehicle and defroster use history information of the vehicle. Here, the parking history information of the vehicle and the defroster use history information of the vehicle can be used to determine whether the boarding position is a point at which at least one of a sports facility and a bathing facility is present. For example, when the boarding position is a point at which at least one of a sports facility and a bathing facility is present, there is a high likelihood that an amount of water vapor generated from the occupant will be relatively great and thus a use frequency of the defroster after starting the vehicle is likely to increase. Accordingly, according to this aspect of the disclosure, it is possible to determine whether the boarding position is a point at which at least one of a sports facility and a bathing facility is present based on the parking history information of the vehicle and the use history information of the defroster of the vehicle.

With regard to above aspects of the disclosure, the electronic control unit or information processing device may additionally change a duration of a state in which the ventilation capacity of the air-conditioning device has increased based on the number of occupants. Here, the larger the number of occupants becomes, the higher a likelihood of an increase in an amount of water vapor generated becomes. Accordingly, according to this aspect of the disclosure, it is possible to adjust the duration by changing the duration of the state in which the ventilation capacity of the air-conditioning device is increased based on the number of occupants.

With regard to above aspects of the disclosure, the air-conditioning device may include an outside/inside air door and adjusts the ventilation capacity by changing an opening level of the outside/inside air door. The air-conditioning device may include an outside/inside air door and a blower motor capable of adjusting an outside air introduction rate, and adjusts the ventilation capacity by changing a rotation speed of the blower motor when an opening level of the outside/inside air door is larger than 0%. The point with the predetermined attribute is set based on parking history information of the vehicle and defroster use history information of the vehicle by the electronic control unit or the information processing device.

A third aspect of the disclosure relates to an information processing device that is disposed remotely from a vehicle and communicates bidirectionally with the vehicle. The information processing device includes: a boarding event detecting unit configured to detect a boarding event in which an occupant boards the vehicle based on an event in which a start switch of the vehicle is turned on; a determination unit configured to determine whether a boarding position which is a position of the vehicle when the boarding event detecting unit detects the boarding event is a point with a predetermined attribute; and a communication unit configured to transmit a predetermined signal to the vehicle when the boarding event detecting unit detects the boarding event and the determination unit determines that the boarding position is a point with the predetermined attribute, wherein the predetermined signal functions as a command for causing a control unit of an air-conditioning device mounted in the vehicle to set a ventilation capacity of the air-conditioning device to be greater than that when the determination unit does not determine that the boarding position is a point with the predetermined attribute.

According to the information processing device, when the boarding event is detected and it is determined that the boarding position is a point with the predetermined attribute, the predetermined signal serving as a command for increasing the ventilation capacity of the air-conditioning device of the vehicle can be transmitted to the vehicle. Accordingly, it is possible to increase the ventilation capacity of the air-conditioning device depending on the attribute of the boarding position.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 11A is a diagram illustrating data in a vehicle information database;

FIG. 11B is a diagram illustrating data in the vehicle information database;

DETAILED DESCRIPTION OF EMBODIMENTS

Hereinafter, embodiments of the disclosure will be described in detail with reference to the accompanying drawings.

First Embodiment

Figure 1:
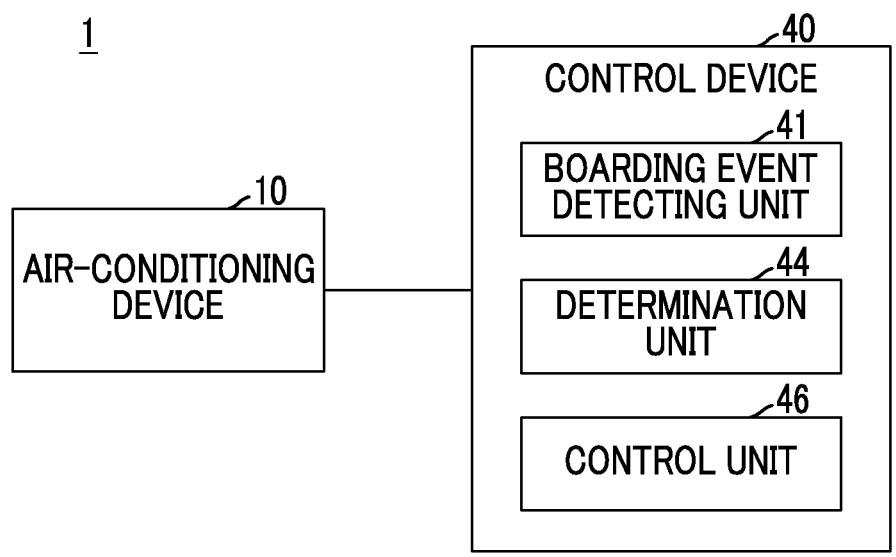
FIG. 1 is a diagram illustrating a basic configuration of an air-conditioning control system according to a first embodiment.

FIG. 1 is a diagram illustrating a basic configuration of an air-conditioning control system 1 according to a first embodiment.

The air-conditioning control system 1 is mounted in a vehicle. Hereinafter, the vehicle in which the air-conditioning control system 1 is mounted is also referred to as a "host vehicle." The air-conditioning control system 1 includes an air-conditioning device 10 and a control device 40.

The air-conditioning device 10 has an adjustable ventilation capacity. The ventilation capacity can be adjusted by changing an opening level of an outside/inside air door (for example, an outside/inside air door 119 illustrated in FIG. 3). The ventilation capacity can be adjusted by changing a rotation speed of a blower motor (for example, a blower motor 122 illustrated in FIG. 3) when an outside air introduction rate is greater than 0%.

Figure 2:
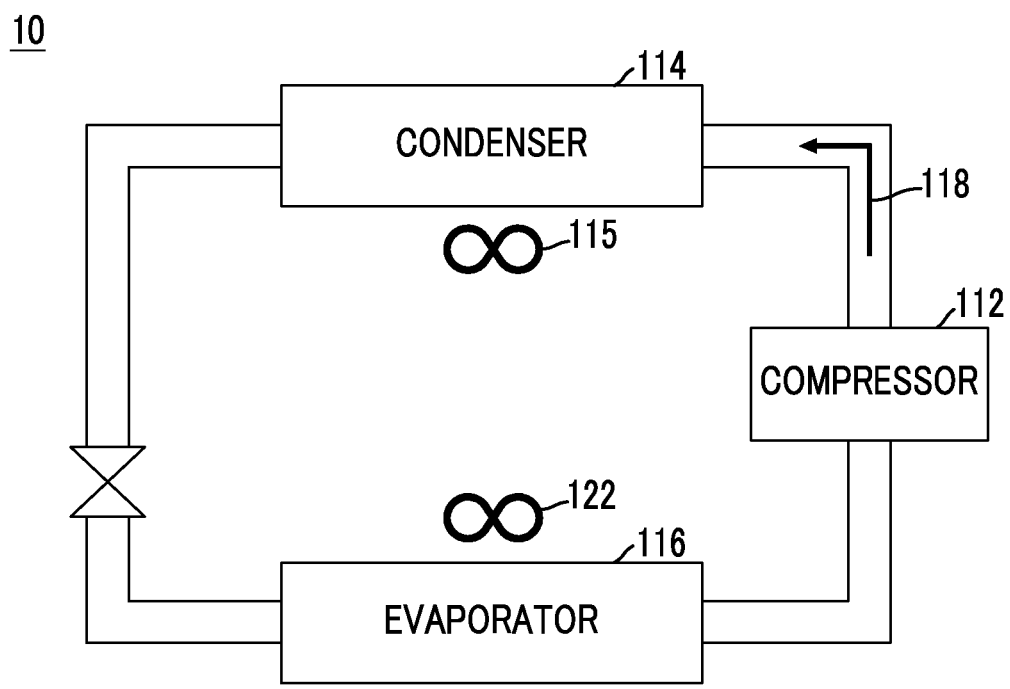
FIG. 2 is a diagram illustrating an example of an air-conditioning device.
Figure 3:
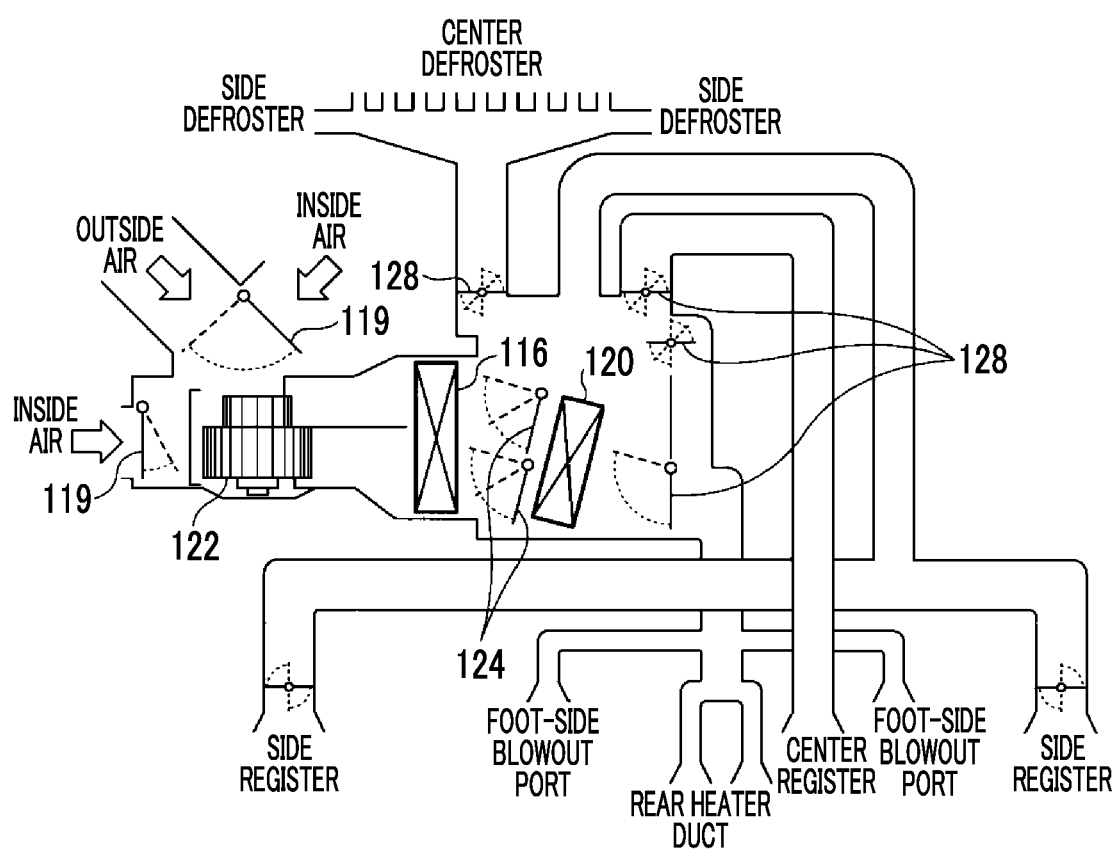
FIG. 3 is a diagram illustrating an example of the air-conditioning device.

FIGS. 2 and 3 are diagrams illustrating an example of the air-conditioning device 10. In the example illustrated in FIGS. 2 and 3, the air-conditioning device 10 includes a compressor 112 that compresses a refrigerant. The refrigerant compressed by the compressor 112 circulates in a refrigerant passage 118 including a condenser 114 and an evaporator 116. The condenser 114 performs a function of cooling a vaporized refrigerant and changing the vaporized refrigerant to a liquid refrigerant to be supplied to the evaporator 116. A suction type electric fan 115 that cools the condenser 114 is disposed in front of the condenser 114. The evaporator 116 is disposed in a vehicle interior. As illustrated in FIGS. 2 and 3, a blower motor (a blower fan) 122 of which a rotation speed can be adjusted is disposed in front of the evaporator 116. The blower motor 122 communicates with the vehicle exterior or the vehicle interior via the outside/inside air door 119. The blower motor 122 has a function of sending air of the vehicle exterior or the vehicle interior (that is, outside air, inside air, or mixed air thereof) to the vehicle interior via the evaporator 116. A flow rate of air sent to the vehicle interior (that is, a blower air volume) is adjusted by controlling the rotation speed of the blower motor 122. When the blower motor 122 rotates, air flowing via the outside/inside air door 119 (that is, outside air, inside air, or mixed air thereof) passes through the evaporator 116. The evaporator 116 cools air passing through the evaporator 116 by vaporizing the refrigerant compressed by the compressor 112. A heater core 120 is disposed behind the evaporator 116. In the heater core 120, an air mixing door 124 of which an opening level can be adjusted (for example, which is driven by a servomotor) is set. The heater core 120 performs a function (a reheating function) of mixing warm air with air (cold air) cooled by the evaporator 116 in cooperation with the air mixing door 124. The temperature of air sent to the vehicle interior is adjusted by controlling the opening level of the air mixing door 124 (that is, a mixing ratio between cold air and warm air). Ducts for guiding mixed air to blowout ports disposed at predetermined positions in the vehicle interior are disposed behind the heater core 120. Mode doors 128 for selectively guiding mixed air to a predetermined blowout port are installed behind the heater core 120.

Figure 4:
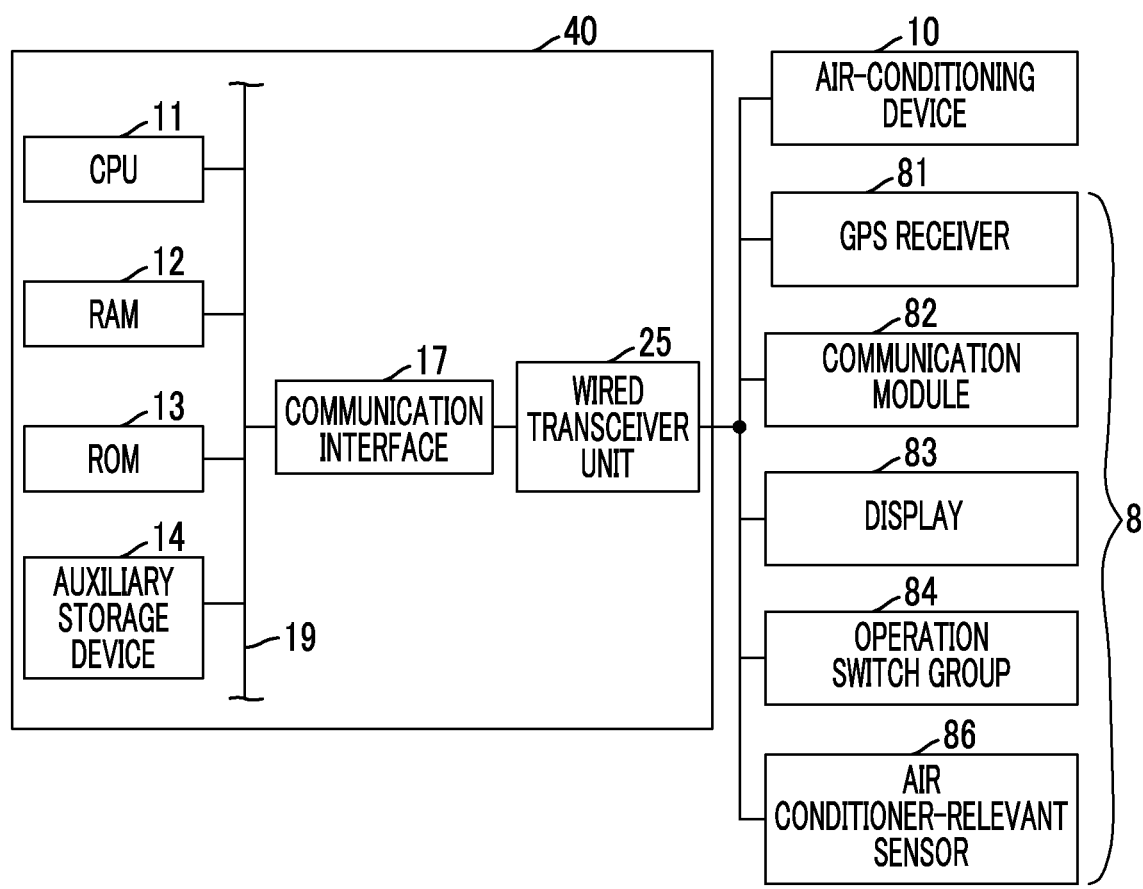
FIG. 4 is a diagram illustrating an example of a hardware configuration of a control device.

The control device 40 is constituted by a computer. For example, the control device 40 is an air-conditioner electronic control unit (ECU). FIG. 4 is a diagram illustrating an example of a hardware configuration of the control device 40. FIG. 4 schematically illustrates an example of elements included in an on-board electronic device group 8 and the air-conditioning device 10 in association with the hardware configuration of the control device 40.

The control device 40 includes a central processing unit (CPU) 11, a random access memory (RAM) 12, a read only memory (ROM) 13, an auxiliary storage device 14, a communication interface 17, which are connected each other by bus 19, and a wired transceiver unit 25 connected to the communication interface 17.

The wired transceiver unit 25 includes a transceiver unit that can perform communication using a vehicle network such as a controller area network (CAN) or a local interconnect network (LIN). The control device 40 may include a wireless transceiver unit (not illustrated) connected to the communication interface 17 in addition to the wired transceiver unit 25. In this case, the wireless transceiver unit may include a near field communication (NFC) unit, a Bluetooth (registered trademark) communication unit, a wireless-fidelity (Wi-Fi) transceiver unit, or an infrared transceiver unit.

The on-board electronic device group 8 includes a global positioning system (GPS) receiver 81, a communication module 82, a display 83, an operation switch group 84, and an air-conditioner-related sensor 86.

The GPS receiver 81 measures a host vehicle position based on radio waves from GPS satellites.

The communication module 82 is a transceiver unit that can perform radio communication, for example, using a radio communication network of a mobile phone. The communication module 82 is fixed to the host vehicle. In a modified example, the communication module 82 may be embodied by a mobile terminal (such as a smartphone or a tablet) that can be brought into the host vehicle. In this case, the control device 40 can communicate with the outside using the communication module 82 via the wireless transceiver unit (for example, the Bluetooth communication unit).

The display 83 is, for example, a touch panel type liquid crystal display. The display 83 is disposed at a position which can be visually seen by a user of the host vehicle (an occupant). The display 83 is a display which is fixed to the host vehicle, but may be a display of a mobile terminal that can be brought into the host vehicle. In this case, communication between the mobile terminal and the control device 40 can be embodied via the wireless transceiver unit (for example, the Bluetooth communication unit).

The operation switch group 84 is disposed in a control panel (not illustrated) which is used for a user to operate the air-conditioning device 10. The control panel is disposed, for example, in an instrument panel. The operation switch group 84 includes an A/C switch for turning on/off operations of the compressor 112, a switch for switching an operation mode (an automatic mode or a manual mode) of the air-conditioning device 10, a switch for switching a suction port mode (an inside air circulation mode or an outside air introduction mode), a switch (a blower dial) for adjusting a blower air volume, a defroster switch for switching ON/OFF of a foot defroster mode or a defroster mode, and a switch (a temperature setting dial) for setting a temperature. A part or whole of the operation switch group 84 may be set by a mobile terminal that can be brought into the host vehicle.

The air-conditioner-related sensor 86 includes an inside air temperature sensor that detects a temperature of the vehicle interior and an outside air temperature sensor that detects a temperature of the vehicle exterior. In addition, the air-conditioner-related sensor 86 may include a solar radiation sensor that detects an amount of solar radiation and a temperature sensor that detects a temperature of cold air immediately after passing through the evaporator 116.

As illustrated in FIG. 1, the control device 40 includes a boarding event detecting unit 41, a determination unit 44, and a control unit 46. The boarding event detecting unit 41, the determination unit 44, and the control unit 46 can be embodied by causing the CPU 11 illustrated in FIG. 4 to execute one or more programs stored in the ROM 13.

The boarding event detecting unit 41 detects a boarding event in which an occupant boards the host vehicle (hereinafter simply referred to as a "boarding event") based on an event in which a start switch of the host vehicle is turned on. The start switch is a switch which is turned on by a user to start the host vehicle and bring the host vehicle into a state in which the host vehicle can travel and which is turned off by a user to release the state in which the host vehicle can travel. The start switch is generally an ignition switch, but may be a power supply switch which is disposed in a power supply line from a high-voltage battery (not illustrated) to an electric motor for traveling (not illustrated) in case of an electric vehicle. Hereinafter, the event in which the start switch of the host vehicle is turned on is also referred to as a "host vehicle start event." For example, in a simple method of detecting a boarding event, the boarding event detecting unit 41 detects occurrence of the host vehicle start event as a boarding event. In another example, in order to accurately detect a boarding event after parking, the boarding event detecting unit 41 may detect as a boarding event occurrence of the host vehicle start event after a predetermined time T0 (for example, 10 [min]) passes from an event in which the start switch of the host vehicle is turned off immediately before. In another example, the boarding event detecting unit 41 may detect a boarding event when the host vehicle start event occurs after a door has been opened and closed in a state in which the start switch is turned off. In another example, the boarding event detecting unit 41 may detect a boarding event when a door lock is unlocked from a locked state in a state in which the start switch is turned off, then a door is opened and closed, and then the host vehicle start event occurs. In the above description, "opening and closing of a door" means a combination of an opening operation and a closing operation thereafter and can be detected using a door switch (not illustrated). In the following description, a "current host vehicle position" when a boarding event is detected is also referred to as a "boarding position."

The determination unit 44 determines whether the boarding position is a point with a predetermined attribute.

A point with the predetermined attribute is a point at which a facility in which an amount of water vapor generated from a user increases significantly (for example, two or more times) after use than before use is present or a point at which a place in which an amount of water vapor generated from a user increases significantly (which is not a "facility" because the place has no equipment) more after use than before use is present. An amount of water vapor generated from a person refers to an amount of moisture evaporating due to respiration and perspiration. In the first embodiment, a point with the predetermined attribute is a point in which at least one of a sports facility and a bathing facility is present. The sports facility is equipment such as a building for sports and examples thereof include a sports gym, a pool, and a hot yoga facility. In the sports facility, there is a high likelihood that an amount of water vapor evaporating due to a user's respiration and perspiration will increase due to sports having high motion intensity. The bathing facility is equipment such as a building for bathing and examples thereof include a public bath, a hot spring, and a sauna. In the bathing facility, there is a high likelihood that an amount of water vapor evaporating due to a user's respiration and perspiration will increase. Accordingly, in the first embodiment, the determination unit 44 determines whether a boarding position is a point in which at least one of a sports facility and a bathing facility is present. In the following description, for the purpose of simplification, the expression, "a boarding position is a point in which at least one of a sports facility and a bathing facility is present," may be replaced with an expression, "a boarding position is a sports facility or a bathing facility."

In an example, the determination unit 44 determines whether a boarding position is a sports facility or a bathing facility based on point of interest (POI) information in the surrounding of the boarding position. The surrounding of the boarding position is, for example, a range within a predetermined distance D0 from the boarding position. The predetermined distance D0 is a value corresponding to the area of a parking lot of the facility and is, for example, 500 m. Although not illustrated in the drawing, the POI information defines a POI name (a formal name), a POI category name, and latitude and longitude of the POI. The POI information includes position information on the sports facility or the bathing facility. The determination unit 44 can acquire the POI information, for example, from a map database of a navigation system (which is not illustrated and which is an element of the on-board electronic device group 8) of the host vehicle. Alternatively, the determination unit 44 may acquire the POI information around the boarding position from the outside (for example, see a server 90 to be described later) via the communication module 82. For example, the determination unit 44 determines that the boarding position is a sports facility or a bathing facility when the boarding position is within the predetermined distance D0 from a position associated with the sports facility or the bathing facility.

In another example, the determination unit 44 determines whether the boarding position is a sports facility or a bathing facility based on parking history information of the host vehicle and defroster use history information of the host vehicle. The parking history information of the host vehicle is information indicating a parking position and a parking date and time of the host vehicle in the past. The defroster use history information of the host vehicle is information indicating a defroster use position of the host vehicle (the host vehicle position at the time of use of the defroster) and a defroster use date and time. The determination method will be supplementarily described later with reference to FIG. 15 after description will be made with reference to FIG. 15.

The determination unit 44 changes a state of a water vapor generation flag based on the determination result of whether the boarding position is a sports facility or a bathing facility. The water vapor generation flag is control information on control of the air-conditioning device 10 and the state of the water vapor generation flag is switched between "0" and "1." The state of the water vapor generation flag is stored in a volatile storage unit (for example, the RAM 12). An initial value of the water vapor generation flag is "0" and is forcibly reset to "0" when the start switch is turned off. The "forcibly reset" means reset when a power supply is turned off due to the volatile storage unit.

When it is determined that boarding position is a sports facility or a bathing facility, the determination unit 44 sets the water vapor generation flag to "1." When the water vapor generation flag is set to "1," the determination unit 44 maintains the water vapor generation flag at "1" until a predetermined reset condition is satisfied. When a reset condition is satisfied, the determination unit 44 resets the water vapor generation flag to "0." The reset condition is satisfied, for example, when a duration of a state in which the water vapor generation flag is "1" reaches a predetermined time. Another example of the reset condition will be described later.

When a boarding event is detected by the boarding event detecting unit 41, the control unit 46 controls the air-conditioning device 10 based on the determination result from the determination unit 44. Hereinafter, unless particularly mentioned, it is assumed that an operation mode is an automatic mode (or the operation mode is an automatic mode and an A/C switch is turned on). In the manual mode, the control unit 46 controls the blower air volume and the opening level of the air mixing door 124 based on an operated position of the blower dial and an operated position (a set temperature) of the temperature setting dial, regardless of the state of the water vapor generation flag.

The control unit 46 sets a ventilation capacity of the air-conditioning device 10 to be higher when the determination unit 44 determines that the boarding position is a sports facility or a bathing facility than when it is determined otherwise. Specifically, When the water vapor generation flag is set to "1," the control unit 46 sets the ventilation capacity of the air-conditioning device 10 to be higher than when the water vapor generation flag is set to "0." The higher the outside air introduction rate becomes, the higher the ventilation capacity of the air-conditioning device 10 becomes. When the outside air introduction rate is significantly higher than 0%, the higher the rotation speed of the blower motor 122 becomes, the higher ventilation capacity of the air-conditioning device 10 becomes. Under the condition of the same rotation speed of the blower motor 122 when the outside air introduction rate is significantly higher than 0%, the longer a ventilation time becomes, the higher the ventilation capacity of the air-conditioning device 10 becomes. For example, when the water vapor generation flag is set to "1," the control unit 46 sets the ventilation capacity of the air-conditioning device 10 to be higher than when the water vapor generation flag is set to "0" in a period until the water vapor generation flag is switched to "0."

In an example, the control unit 46 sets the outside air introduction rate to a first outside air introduction rate (for example, 0%) when the water vapor generation flag is set to "0," and sets the outside air introduction rate to a second outside air introduction rate (>the first outside air introduction rate, for example, 100%) when the water vapor generation flag is set to 1." The outside air introduction rate can be changed by adjusting the opening level of the outside/inside air door 119.

In another example, the control unit 46 sets the outside air introduction rate to the first outside air introduction rate and sets the rotation speed of the blower motor 122 to a first rotation speed when the water vapor generation flag is set to "0," and sets the outside air introduction rate to the second outside air introduction rate and sets the rotation speed of the blower motor 122 to a second rotation speed N2 (>the first rotation speed N1: for example, a maximum value) when the water vapor generation flag is set to "1."

In the following description, the above-mentioned control method which is used by the control unit 46 when the water vapor generation flag is set to "0" is referred to as a "first control method," and the above-mentioned control method which is used by the control unit 46 when the water vapor generation flag is set to 1 is referred to as a "second control method." The second control method may be accompanied with ON of the defroster mode (or the foot defroster mode) in which a defroster is used.

When the boarding position is a sports facility or a bathing facility, there is a high likelihood that an occupant would perform a heavy motion before boarding the host vehicle. In general, an amount of water vapor generated from a person differs greatly when the person performs a heavy motion and when the person is sitting quietly. For example, an amount of water vapor generated from a male adult in a quiet sitting state at an indoor temperature of 25° C. is 65 g/h, and an amount of water vapor generated in a heavy moving state is 373 g/h. The amount of water vapor generated after a heavy motion is performed decreases gradually from the amount of water vapor generated in the heavy moving state with the lapse of time from the heavy motion, but a state in which the amount of water vapor generated after the heavy motion is significantly greater than the amount of water vapor generated in the quiet sitting state is maintained for a while. Therefore, when the boarding position is a sports facility or a bathing facility, there is a high likelihood that the amount of water vapor generated from an occupant is relatively large. Accordingly, when the boarding position is a sports facility or a bathing facility, there is concern that cloudiness of a window (for example, a front windshield) will start immediately after departure due to the relatively large amount of water vapor generated from the occupant.

In this regard, according to the above-mentioned air-conditioning control system 1, when it is determined that the boarding position is a sports facility or a bathing facility, the water vapor generation flag is set to "1." When the water vapor generation flag is set to "1," the control unit 46 controls the air-conditioning device 10 based on the second control method. Accordingly, according to the air-conditioning control system 1, it is possible to enhance the ventilation capacity of the air-conditioning device 10 depending on the attribute of the boarding position. As a result, when the amount of water vapor generated from the occupant is large and there is a high necessity for ventilation, it is possible to automatically enhance the ventilation capacity of the air-conditioning device 10 such that cloudiness of the window does not occur. In this case, it is possible to reduce the likelihood that cloudiness of the window will occur after departure due to the amount of water vapor generated from an occupant and to reduce poor visibility or a driver's stress due to the cloudiness of the window. It is not necessary for a user to manually operate a switch for enhancing the ventilation capacity and it is possible to improve convenience to the user.

In recent years, there is a tendency to reduce exhaust heat due to improvement in efficiency of an internal combustion engine and there is a problem in that additional energy has to be used to acquire a necessary heating capacity and thus fuel efficiency of a host vehicle degrades. In a hybrid vehicle or an electric vehicle in which exhaust heat cannot be used, a heating load has a great influence on fuel efficiency or a cruising range. In order to reduce the heating load, it is useful to increase an inside air circulation rate and to decrease a ventilation loss. When the host vehicle includes an internal combustion engine, it is useful to decrease the ventilation loss for the purpose of earlier warming-up of the internal combustion engine.

In this regard, according to the above-mentioned air-conditioning control system 1, when the water vapor generation flag is not set to "1," the first control method is used, the ventilation capacity of the air-conditioning device 10 is lower than that in the second control method (that is, the inside air circulation rate is higher), and it is thus possible to decrease the ventilation loss. In this way, according to the air-conditioning control system 1, it is possible to decrease the ventilation loss and to reduce cloudiness of a window due to an amount of water vapor generated from an occupant.

According to the air-conditioning control system 1, since the above-mentioned advantages can be achieved without disposing a humidity sensor in the host vehicle, there is an advantage in terms of costs.

Some operation examples of the control device 40 will be described below with reference to FIGS. 5 to 9.

Figure 5:
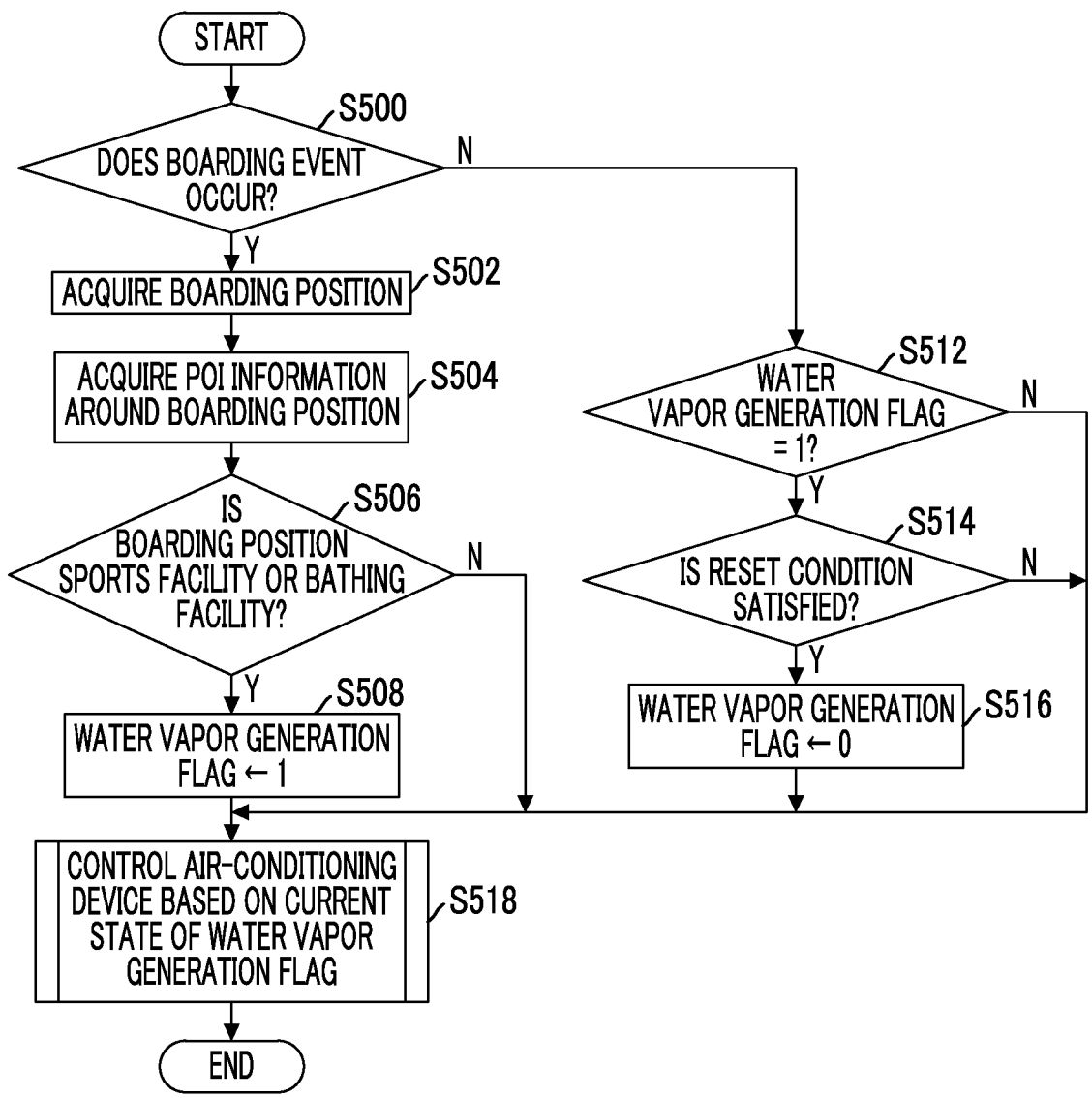
FIG. 5 is a flowchart schematically illustrating an example of a process flow which is performed by the control device.

FIG. 5 is a flowchart schematically illustrating an example of a process flow which is performed by the control device 40. The process flow illustrated in FIG. 5 is started, for example, when a start event of a host vehicle occurs and is performed with a predetermined cycle during operation of the host vehicle (that is, while the start switch is in an ON state).

In Step S500, the boarding event detecting unit 41 determines whether a boarding event occurs. In FIG. 5, for example, the boarding event detecting unit 41 detects occurrence of the start event of the host vehicle as the boarding event. Accordingly, when a first process flow after starting is performed, the boarding event detecting unit 41 determines that a boarding event occurs. The process of Step S502 is performed when the determination result is "YES," and the process of Step S512 is performed otherwise.

In Step S502, the determination unit 44 acquires a current host vehicle position (a boarding position) from the GPS receiver 81.

In Step S504, the determination unit 44 acquires POI information around the boarding position based on information of the boarding position acquired in Step S502. In FIG. 5, for example, the determination unit 44 acquires the POI information within a predetermined distance D0 from the boarding position.

In Step S506, the determination unit 44 determines whether the boarding position is a sports facility or a bathing facility based on the POI information acquired in Step S504. In FIG. 5, for example, when the POI information acquired in Step S504 includes at least one of a sports facility and a bathing facility, the determination unit 44 determines that the boarding position is a sports facility or a bathing facility. The process of Step S508 is performed when the determination result is "YES," and the process of Step S518 is performed otherwise.

In Step S508, the determination unit 44 sets the water vapor generation flag to In Step S512, the determination unit 44 determines whether the water vapor generation flag is set to "1." The process of Step S514 is performed when the determination result is "YES," and the process of Step S518 is performed otherwise (that is, when the water vapor generation flag is set to "0").

In Step S514, the determination unit 44 determines whether a reset condition is satisfied. In FIG. 5, for example, when a duration of a state in which the water vapor generation flag is set to "1" reaches a predetermined time (a fixed value), the determination unit 44 determines that the reset condition is satisfied. The process of Step S516 is performed when the determination result is "YES," and the process of Step S518 is performed otherwise.

In Step S516, the determination unit 44 resets the water vapor generation flag to "0."

In Step S518, the control unit 46 controls the air-conditioning device 10 depending on the current state of the water vapor generation flag. This control method is the same as described above.

According to the process flow illustrated in FIG. 5, it is determined whether the boarding position is a sports facility or a bathing facility whenever the start switch of the host vehicle is switched from OFF to ON, and it is possible to enhance the ventilation capacity of the air-conditioning device 10 when it is determined that the boarding position is a sports facility or a bathing facility. When the reset condition is satisfied in the state in which the ventilation capacity of the air-conditioning device 10 is increased, it is possible to release the state in which the ventilation capacity of the air-conditioning device 10 is increased.

Figure 6:
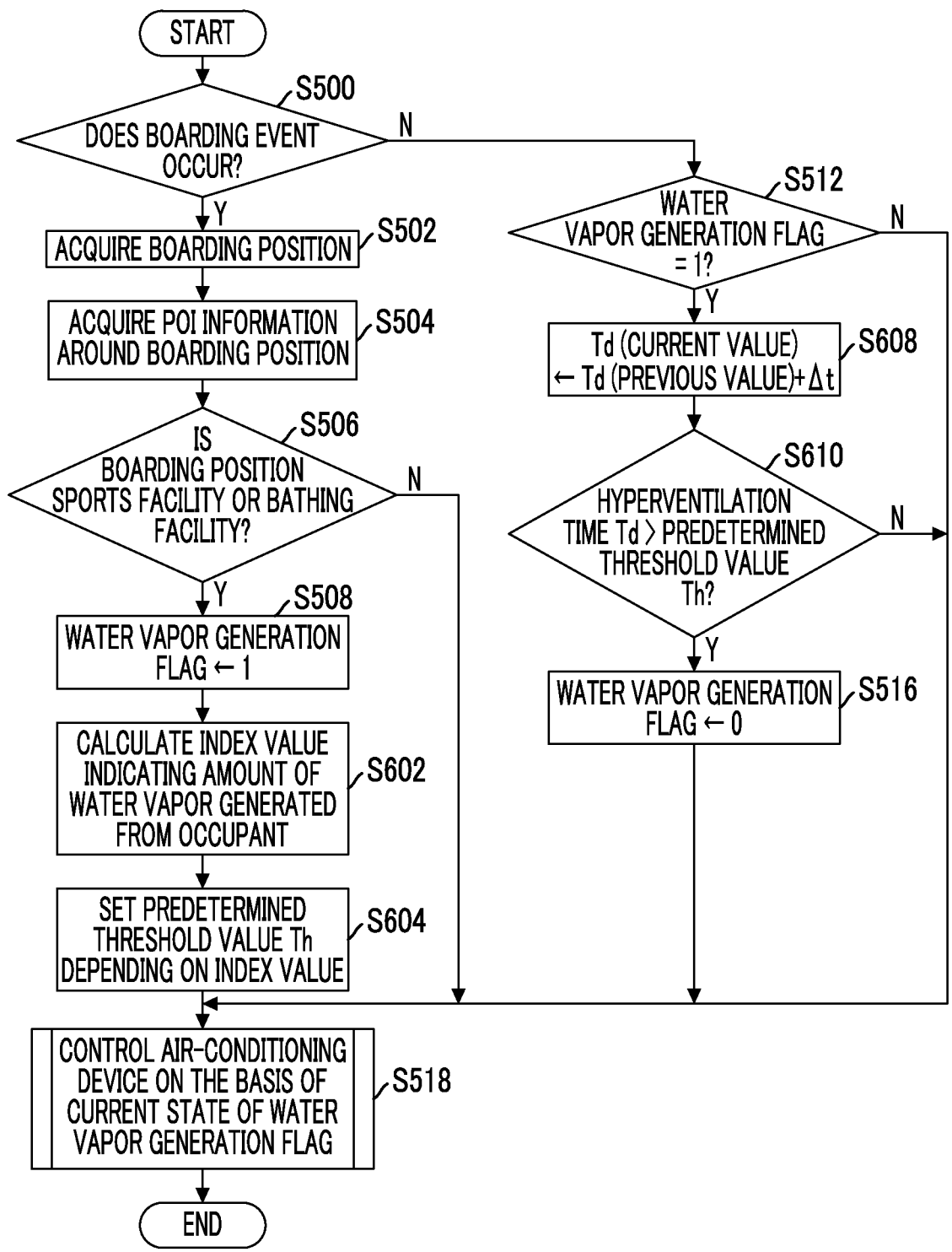
FIG. 6 is a flowchart schematically illustrating another example of the process flow which is performed by the control device.

FIG. 6 is a flowchart schematically illustrating another example (an alternative of the example illustrated in FIG. 5) of a process flow which is performed by the control device 40. The process flow illustrated in FIG. 6 is started, for example, when a start event of a host vehicle occurs and is performed with a predetermined cycle during operation of the host vehicle.

In FIG. 6, the same processes as illustrated in FIG. 5 will be referenced by the same step numbers and description thereof will not be repeated. The process flow illustrated in FIG. 6 is different from the process flow illustrated in FIG. 5, in that Steps S602 and S604 are additionally performed between Step S508 and Step S518 and Steps S608 and S610 are performed instead of Step S514. The differences will be described below.

In Step S602, the determination unit 44 calculates an index value indicating the amount of water vapor generated from an occupant who has boarded at the time of the boarding event detected in Step S500. The index value is calculated using the number of occupants as a parameter. The index value increases as the number of occupants increases. In addition, the index value may be calculated using an occupant's physical constitution as an additional parameter. For example, the index value increases as the occupant's physical constitution increases.

Figures 7, 8:
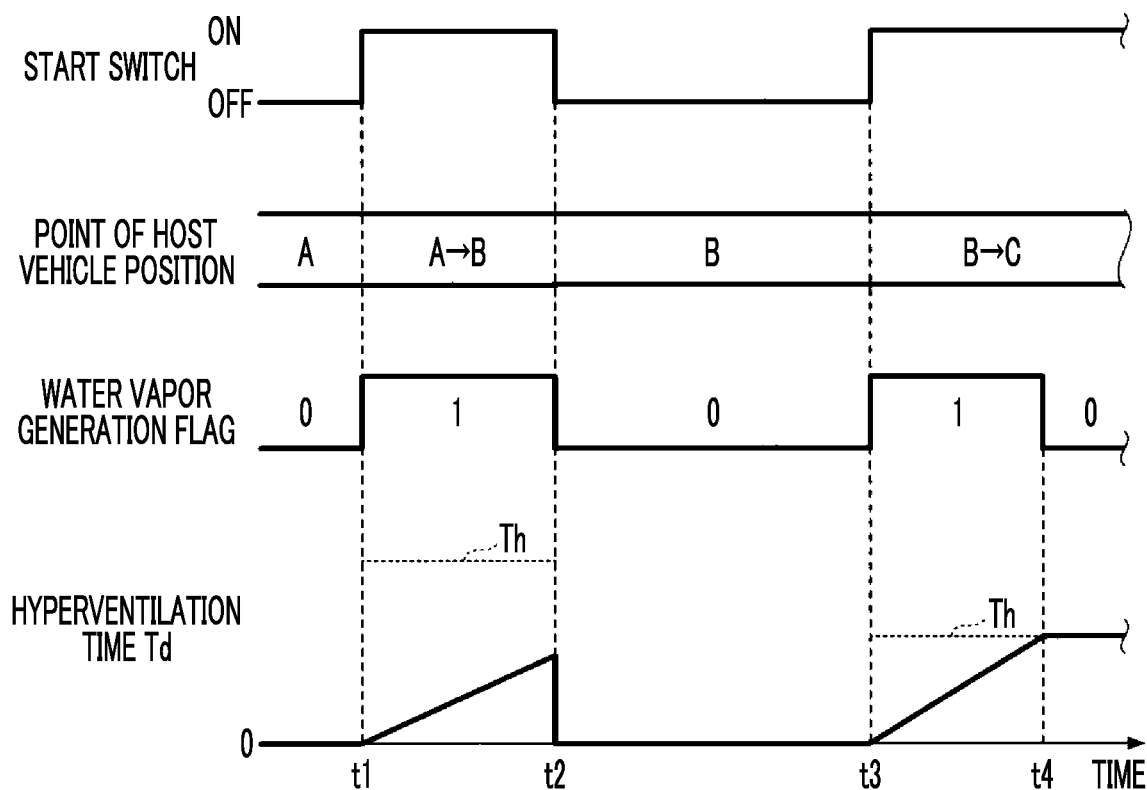
FIG. 7 is a diagram illustrating an index value calculation map.
FIG. 8 is a diagram illustrating the process flow illustrated in FIG. 6.

Herein, for example, the determination unit 44 calculates the index value using a map illustrated in FIG. 7. The index value is an increase in absolute humidity (weight absolute humidity) [g/kg] due to the amount of water vapor generated from an occupant over a predetermined time Tr and is an increase in normal value in a quiet sitting state. The predetermined time Tr is, for example, a fixed value corresponding to an average trip time. FIG. 7 illustrates a relationship between the number of occupants and the increase in absolute humidity. The number of occupants can be determined using a seat sensor, a door switch, a seat belt sensor, or the like. For example, when the number of occupants is two, 4.0 is extracted from FIG. 7, and the increase in absolute humidity is 4.0. The numerical values illustrated in FIG. 7 are an example for explanation and, for example, numerical values acquired from a test result are actually used.

In a case in which a physical constitution is considered, for example, values obtained by multiplying the values in the map illustrated in FIG. 7 by 0.8 may be used when the occupant is an adult female, and values obtained by multiplying the values in the map illustrated in FIG. 7 by 0.5 may be used when the occupant is a child. The physical constitution can be determined by a weight sensor of a seat, image recognition, or the like.

In Step S604, the determination unit 44 sets a predetermined threshold value Th corresponding to the index value calculated in Step S602. The determination unit 44 sets the predetermined threshold value Th such that the predetermined threshold value Th increases as the index value increases. For example, the determination unit 44 may set the predetermined threshold value Th=5 [min] when the index value is equal to or less than 2 [g/kg], may set the predetermined threshold value Th=10 [min] when the index value ranges from 2 [g/kg] to 5 [g/kg], and may set the predetermined threshold value Th=trip period when the index value is equal to or greater than 5 [g/kg]. When the predetermined threshold value Th is set to a trip period, the water vapor generation flag is maintained to be "1" during the trip. Accordingly, when the predetermined threshold value Th is set to the trip period and the determination result of Step S512 is "YES" in the process flow illustrated in FIG. 6, the process of Step S518 is directly performed.

In Step S608, the determination unit 44 adds a predetermined time Δt to a current value (a previous value) of a hyperventilation time Td and updates the hyperventilation time Td. The predetermined time Δt corresponds to a process cycle. The hyperventilation time Td corresponds to a time of the state in which the water vapor generation flag is set to "1" in this start switch ON event. The hyperventilation time Td is forcibly reset to "0" when the start switch is turned off.

In Step S610, the determination unit 44 determines whether the hyperventilation time Td is greater than the predetermined threshold value Th set in Step S604. The process of Step S516 is performed when the determination result is "YES," and the process of Step S518 is performed otherwise.

According to the process flow illustrated in FIG. 6, it is determined whether the boarding position is a sports facility or a bathing facility whenever the start switch of the host vehicle is switched from OFF to ON, and the water vapor generation flag is set to "1" when it is determined that the boarding position is a sports facility or a bathing facility. Thereafter, during operation of the host vehicle, the hyperventilation time Td is updated to increase with the lapse of time, and the water vapor generation flag is reset to "0" when the hyperventilation time Td is greater than the predetermined threshold value Th.

FIG. 8 is a diagram illustrating the process flow illustrated in FIG. 6. In FIG. 8, the state of the start switch, the point of the current host vehicle position, the state of the water vapor generation flag, and the hyperventilation time Td are sequentially illustrated from the uppermost in a time series. The predetermined threshold value Th appears together in the time series of the hyperventilation time Td.

In FIG. 8, a boarding event at time t1 occurs, for example, at point A. Point A is a ski resort (an example of a sports facility). Accordingly, the water vapor generation flag is set to "1" to correspond to the boarding event at time t1. After time t1, the hyperventilation time Td increases until the host vehicle reaches point B but the hyperventilation time Td does not reach the predetermined threshold value Th and thus the water vapor generation flag is maintained to be "1." At time t2, for example, the host vehicle reaches point B and the start switch is turned off. When a boarding event at point B occurs (at time t3), point B is a hot spring and thus the water vapor generation flag is set to "1" to correspond to the boarding event at time t3. Accordingly, similarly to when the host vehicle starts at time t1, the ventilation capacity of the air-conditioning device 10 can also be increased when the host vehicle starts at time t3. At time t3, the predetermined threshold value Th is set in the same way as at time t1, but the predetermined threshold value Th set at time t3 is smaller than the predetermined threshold value Th set at time t1 (for example, because the number of occupants decreases). Thereafter, at time t4, the hyperventilation time Td reaches the predetermined threshold value Th and the water vapor generation flag is reset to "0." As a result, the state in which the ventilation capacity of the air-conditioning device 10 has been increased is released at time t4.

In this way, according to the process flow illustrated in FIG. 6, the duration of the state in which the ventilation capacity of the air-conditioning device 10 has been increased can be changed depending on the index value.

Figure 9:
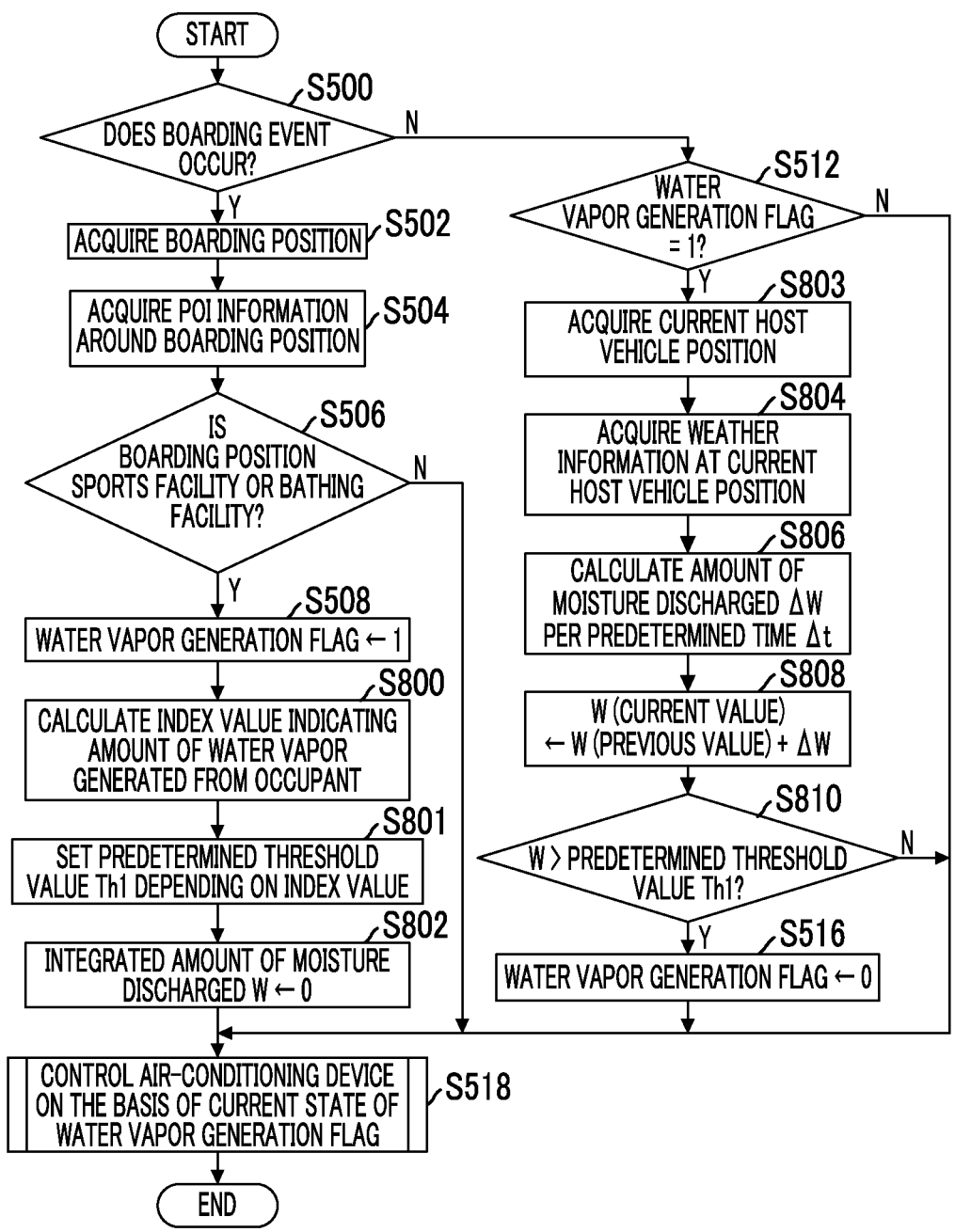
FIG. 9 is a flowchart schematically illustrating another example of the process flow which is performed by the control device.

FIG. 9 is a flowchart schematically illustrating another example (an alternative of the example illustrated in FIG. 5) of a process flow which is performed by the control device 40. The process flow illustrated in FIG. 9 is started, for example, when a start event of a host vehicle occurs and is performed with a predetermined cycle during operation of the host vehicle.

In FIG. 9, the same processes as illustrated in FIG. 5 will be referenced by the same step numbers and description thereof will not be repeated. The process flow illustrated in FIG. 9 is different from the process flow illustrated in FIG. 5, in that Steps S800 to S802 are additionally performed between Step S508 and Step S518 and Steps S803 to S810 are performed instead of Step S514. The differences will be described below.

In Step S800, the determination unit 44 calculates an index value indicating the amount of water vapor generated from an occupant having boarded at the time of the boarding event detected in Step S500. The method of calculating the index value is the same as described above in Step S602 illustrated in FIG. 6.

In Step S801, the determination unit 44 sets a predetermined threshold value Th1 corresponding to the index value calculated in Step S800. The determination unit 44 sets the predetermined threshold value Th1 such that the predetermined threshold value Th1 increases as the index value increases. In FIG. 9, for example, the determination unit 44 sets the predetermined threshold value Th1 as the index value.

In Step S802, the determination unit 44 initializes an integrated amount of moisture discharged W [g/kg] to 0. The integrated amount of moisture discharged W is an integrated value of an amount of moisture discharged from the host vehicle by ventilation of the air-conditioning device 10.

In Step S803, the determination unit 44 acquires a current host vehicle position from the GPS receiver 81.

In Step S804, the determination unit 44 acquires weather information indicating weather at a current time point at the current host vehicle position via the communication module 82. Here, it is assumed that the weather information includes information of humidity at the current host vehicle position. The humidity at the host vehicle position is humidity outside the host vehicle and corresponds to outside air humidity. The weather information can be acquired, for example, from a server (not illustrated) providing weather information.

In Step S806, the determination unit 44 calculates an amount of moisture discharged from the host vehicle by ventilation of the air-conditioning device 10 (hereinafter referred to as an "amount of moisture discharged") [g/kg] based on current temperature and humidity information inside and outside the host vehicle. Here, the determination unit 44 calculates an amount of moisture discharged ΔW per predetermined time Δt. The predetermined time Δt corresponds to the process cycle. For example, the amount of moisture discharged ΔW can be calculated by calculating a ventilation air volume per predetermined time Δt based on a blower air volume or the like and subtracting an amount of moisture included in outside air corresponding to the ventilation air volume from the amount of moisture included in inside air corresponding to the ventilation air volume. The amount of moisture included in the inside air is calculated based on the current inside air temperature (which is acquired from an inside air temperature sensor which is an element of the air-conditioner-related sensor 86) with relative humidity as 100%. The amount of moisture included in the outside air can be calculated based on the weather information (the outside air humidity) and the outside air temperature acquired in Step S804. As the outside air temperature, a detected value of the outside air temperature sensor (which is an element of the air-conditioner-related sensor 86) or the outside air temperature information which may be included in the weather information can be used.

In Step S808, the determination unit 44 adds the amount of moisture discharged ΔW calculated in Step S806 to the current value of the integrated amount of moisture discharged W to update the integrated amount of moisture discharged W.

In Step S810, the determination unit 44 determines whether the integrated amount of moisture discharged W is greater than the predetermined threshold value Th1 set in Step S801. The process of Step S516 is performed when the determination result is "YES," and the process of Step S518 is performed otherwise.

According to the process flow illustrated in FIG. 9, it is determined whether the boarding position is a sports facility or a bathing facility whenever the start switch of the host vehicle is turned on, and the water vapor generation flag is set to "1" and the index value indicating the amount of water vapor generated from the occupant is calculated when it is determined that the boarding position is a sports facility or a bathing facility. Thereafter, the integrated amount of moisture discharged W which is an integrated value of the amount of moisture discharged by ventilation of the air-conditioning device 10 is updated and the water vapor generation flag is reset to "0" when the integrated amount of moisture discharged W is greater than the predetermined threshold value Th1. In this way, according to the process flow illustrated in FIG. 9, it is possible to accurately estimate the timing at which an increase in the amount of water vapor generated from the occupant (an increase due to a heavy motion) is completely discharged to the outside by ventilation by calculating the integrated amount of moisture discharged W. Accordingly, it is possible to adjust the duration of the state in which the ventilation capacity of the air-conditioning device 10 has been increased by changing the duration of the state in which the ventilation capacity of the air-conditioning device 10 has been increased depending on the index value.

In the operation examples illustrated in FIGS. 5 to 8 among the operation examples described above with reference to FIGS. 5 to 9, the communication module 82 is not necessary. Accordingly, when the operation examples illustrated in FIGS. 5 to 8 are employed, the communication module 82 may be removed from the on-board electronic device group 8 if necessary.

Second Embodiment

An air-conditioning control system 1A according to a second embodiment is different from the air-conditioning control system 1 according to the first embodiment, in that the control device 40 is replaced with a control device 40A and a server 90 is added. In the following description, the differences will be described, the same elements will be reference by the same reference numerals, and description thereof will not be repeated.

Figure 10:
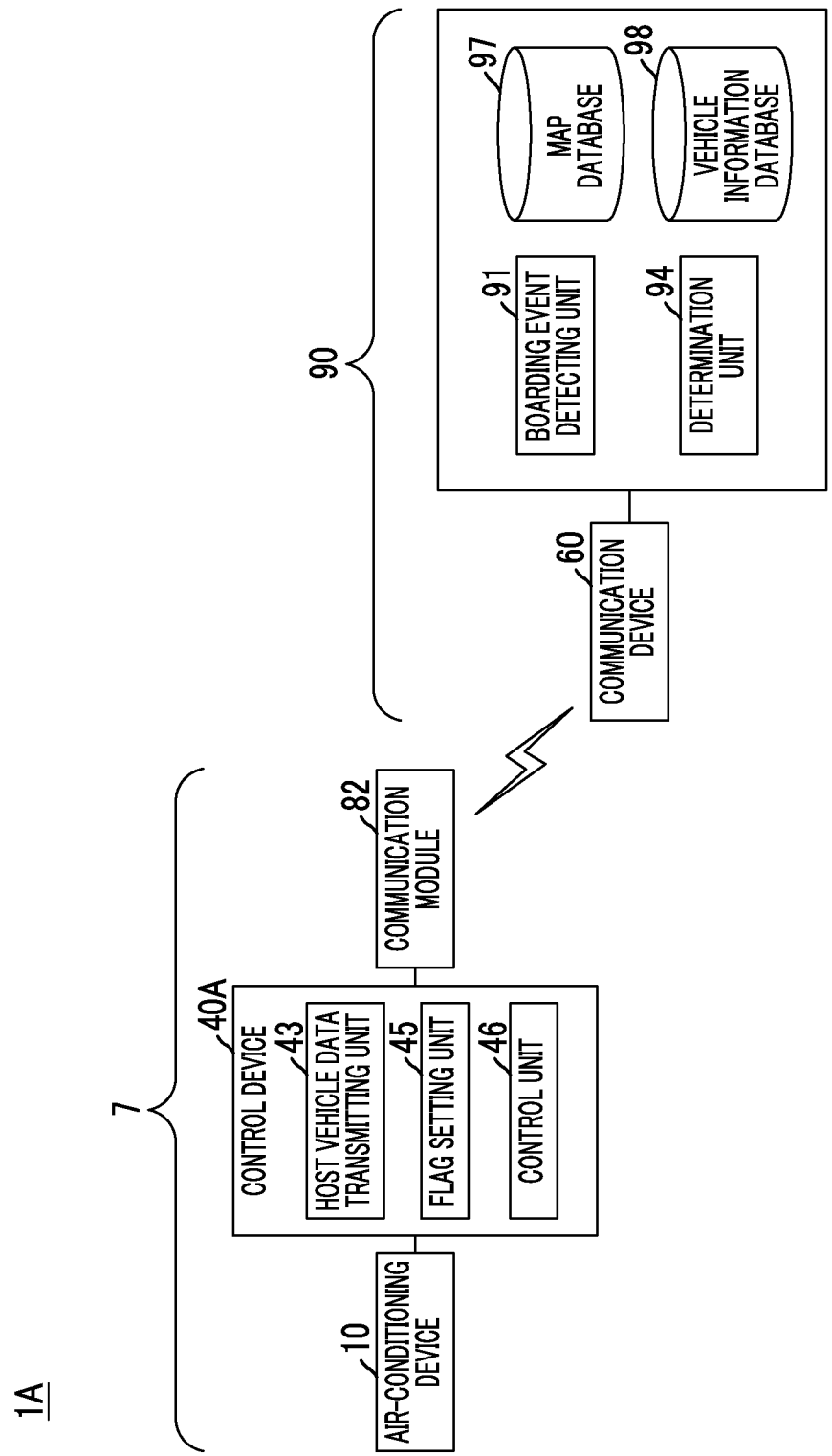
FIG. 10 is a diagram illustrating a basic configuration of an air-conditioning control system according to a second embodiment.

FIG. 10 is a diagram illustrating a basic configuration of the air-conditioning control system 1A according to the second embodiment.

The air-conditioning control system 1A includes an on-board device 7 mounted in a host vehicle and a server 90 (which is an example of the information processing device). The on-board device 7 includes an air-conditioning device 10, a control device 40A, and a communication module 82 (which is an example of the communication unit). The on-board device 7 includes an on-board electronic device group 8 (see FIG. 4) in addition to the air-conditioning device 10 and the communication module 82. Similarly, in the following description, a "host vehicle" means a vehicle in which the on-board device 7 is mounted unless particularly mentioned.

The hardware configuration of the control device 40A is the same as the hardware configuration of the control device 40 illustrated in FIG. 4. The control device 40A is different from the control device 40 according to the first embodiment, in that a host vehicle data transmitting unit 43 and a flag setting unit 45 are provided instead of the determination unit 44.

Specifically, the control device 40A includes the host vehicle data transmitting unit 43, the flag setting unit 45, and the control unit 46. The host vehicle data transmitting unit 43 and the flag setting unit 45 can be embodied by causing the CPU 11 to execute one or more programs stored in the ROM 13.

The host vehicle data transmitting unit 43 periodically transmits travel information to the server 90 during operation of the host vehicle. The host vehicle data transmitting unit 43 transmits the travel information to the server 90 via the communication module 82. In the second embodiment, as illustrated in FIG. 11A, for example, the travel information includes a terminal identification (ID), a travel date and time, a traveling speed, a link ID, and an ON/OFF state of a defroster switch (which is an element of the operation switch group 84) of the host vehicle. The terminal ID is an ID of the communication module 82. The link ID included in the travel information is associated with a link in which the host vehicle travels. The link ID associated with the link in which the host vehicle travels can be acquired based on host vehicle position information from the GPS receiver 81 and information in a map database (not illustrated). The link ID included in the travel information includes, for example, link IDs associated with all links through which the host vehicle passes from the previous transmission cycle to the current transmission cycle. The travel date and time is, for example, a date and time of a time point of the current transmission cycle. The traveling speed is an average speed when the host vehicle travels in the links associated with the corresponding link IDs. As described above, the defroster switch is turned on when the defroster is used (when a foot defroster mode or a defroster mode is performed), and is turned off when the defroster is not used. The travel information includes defroster use history information of the host vehicle. In this case, the defroster use history information includes the terminal ID, the travel date and time, the link ID, and the ON/OFF state of the defroster switch of the host vehicle in the travel information.

In a modified example, the host vehicle data transmitting unit 43 may transmit the defroster use history information to the server 90 via the communication module 82 independently from the travel information. In this case, for example, when an ON/OFF event of the defroster switch of the host vehicle occurs during operation of the host vehicle, the host vehicle data transmitting unit 43 may transmit the defroster use history information to the server 90 via the communication module 82. In this case, the defroster use history information includes a terminal ID, a defroster ON/OFF date and time, and host vehicle position information (latitude and longitude) at that time.

When the start switch is turned on/off, the host vehicle data transmitting unit 43 transmits start ON/OFF information to the server 90 via the communication module 82. The start ON/OFF information includes a terminal ID, a start ON/OFF date and time, and host vehicle position information (latitude and longitude) at that time as illustrated in FIG. 11B. OFF of an accessory switch may be used instead of OFF of the start switch.

The flag setting unit 45 changes a state of a water vapor generation flag based on a set signal (which is an example of the predetermined signal) and a reset signal transmitted from the server 90. When the set signal is received from the server 90 via the communication module 82, the flag setting unit 45 sets the water vapor generation flag to "1." In this way, the set signal from the server 90 serves as a command for setting the water vapor generation flag to "1" for the flag setting unit 45 (and a command for enhancing the ventilation capacity of the air-conditioning device based on the second control method for the control unit 46). When the reset signal is received from the server 90 via the communication module 82, the flag setting unit 45 resets the water vapor generation flag to "0." In this way, the reset signal from the server 90 serves as a command for resetting the water vapor generation flag to "0" for the flag setting unit 45. The water vapor generation flag is forcibly reset to "0" when the start switch is turned off. The meaning of the water vapor generation flag is the same as described in the first embodiment. Accordingly, when the communication module 82 receives the set signal, the control unit 46 sets the ventilation capacity of the air-conditioning device 10 to be higher than when the communication module 82 does not receive the set signal.

The server 90 is disposed remotely from the host vehicle. The hardware configuration of the server 90 is not illustrated. A basic architecture (configuration) of the server 90 is substantially the same as the hardware configuration of the control device 40 illustrated in FIG. 4, except that a communication device 60 is provided, and both configurations are different in that a processing capability and a storage capacity are increased. The server 90 may be a single unit or may be constituted, for example, by a plurality of server devices which are connected to each other via a network in a communicable manner.

The communication device 60 communicates with the communication module 82 of the host vehicle. At the time of communication, the communication device 60 and the communication module 82 of the host vehicle are connected to each other via a network including a radio communication network of a mobile phone. Examples of the network include a world wide web (WWW), a virtual private network (VPN), a wide area network (WAN), and a wired network in addition to the radio communication network.

The server 90 includes a boarding event detecting unit 91, a determination unit 94, a map database 97, and a vehicle information database 98. The boarding event detecting unit 91 and the determination unit 94 can be embodied by causing the CPU to execute one or more programs stored in the ROM. The databases such as the map database 97 can be embodied by an auxiliary storage device (such as a hard disk drive).

The boarding event detecting unit 91 detects a boarding event. For example, the boarding event detecting unit 91 detects occurrence of a start event of the host vehicle as a boarding event. Occurrence of the start event of the host vehicle can be detected based on start ON/OFF information.

The determination unit 94 determines whether the boarding position is a point with a predetermined attribute. In the second embodiment, similarly to the first embodiment, the point with the predetermined attribute is a point at which at least one of a sports facility and a bathing facility is present. The boarding position of the host vehicle can be detected based on the start ON/OFF information of the host vehicle.

In an example, the determination unit 94 acquires POI information around the boarding position from the map database 97 and determines whether the boarding position is a sports facility or a bathing facility based on the POI information. In this case, a basic idea of the determination method is the same as in the determination unit 44 according to the first embodiment and thus detailed description thereof will not be repeated.

In another example, the determination unit 94 determines whether the boarding position is a sports facility or a bathing facility based on the parking history information of the host vehicle and the defroster use history information of the host vehicle. The parking history information and the defroster use history information are the same as described above. An example of this determination method will be described later with reference to FIG. 15.

The determination unit 94 changes a state of a ventilation promotion service flag based on the determination result of whether the boarding position is a sports facility or a bathing facility. The ventilation promotion service flag is control information associated with the control of the air-conditioning device 10 and the state of the ventilation promotion service flag is switched between "0" and "1." The state of the ventilation promotion service flag is stored in a storage unit (such as a RAM 12 or an auxiliary storage device 14) of the server 90.

When it is determined that the boarding position is a sports facility or a bathing facility, the determination unit 94 sets the ventilation promotion service flag to "1," and sets the ventilation promotion service flag to "0" otherwise. An initial value of the ventilation promotion service flag is "0." When the ventilation promotion service flag is set to "1," the determination unit 94 maintains the ventilation promotion service flag at "1" until a predetermined condition (hereinafter referred to as a "flag releasing condition") is satisfied thereafter. When the flag releasing condition is satisfied, the determination unit 94 resets the ventilation promotion service flag to "0." The basic idea of the flag releasing condition is the same as the reset condition which is used by the determination unit 44 according to the first embodiment and thus detailed description thereof will not be made. The flag releasing condition is satisfied, for example, when the duration of the state in which the ventilation promotion service flag is "1" reaches a predetermined time. Another example of the flag releasing condition will be described later.

The determination unit 94 transmits the set signal to the communication module 82 of the host vehicle via the communication device 60 when the boarding event detecting unit 91 detects a boarding event and it is determined that the boarding position is a sports facility or a bathing facility. In the second embodiment, for example, the determination unit 94 transmits the set signal to the communication module 82 of the host vehicle via the communication device 60 when the boarding event is detected and the ventilation promotion service flag is set to "1." The determination unit 94 transmits the reset signal to the communication module 82 of the host vehicle via the communication device 60 when the ventilation promotion service flag is reset from "1" to "0" during operation of the host vehicle.

The map database 97 stores map data of the whole country. The map data includes POI information.

The vehicle information database 98 stores the travel information or the start ON/OFF information received from various vehicles including the host vehicle. FIG. 11A conceptually illustrates an example of data of the travel information in the vehicle information database 98. FIG. 11A illustrates data associated with a certain travel information ID=j. The travel information ID is given for each trip. FIG. 11B conceptually illustrates an example of data of the start ON/OFF information in the vehicle information database 98. FIG. 11B illustrates data associated with a plurality of travel information IDs. In FIGS. 11A and 11B, "**" indicates that corresponding information is present.

According to the air-conditioning control system 1A, the same advantages as in the air-conditioning control system 1 are obtained. That is, the server 90 determines whether a boarding position is a sports facility or a bathing facility when a boarding event of the host vehicle is detected, and sets the ventilation promotion service flag to "1" when it is determined that the boarding position is a sports facility or a bathing facility. When the ventilation promotion service flag is set to "1," the set signal is transmitted to the host vehicle and the water vapor generation flag is set to "1." When the water vapor generation flag is set to "1," the control unit 46 controls the air-conditioning device 10 based on the second control method. Accordingly, according to the air-conditioning control system 1A, it is possible to enhance the ventilation capacity of the air-conditioning device 10 depending on the attribute of the boarding position. According to the air-conditioning control system 1A, when the water vapor generation flag is not set to "1," the first control method is used, the ventilation capacity of the air-conditioning device 10 is set to be lower than that in the second control method, and it is thus possible to reduce a ventilation loss. As a result, according to the air-conditioning control system 1A, it is possible to reduce a ventilation loss and to reduce cloudiness of a window due to the amount of water vapor generated from an occupant.

Some operation examples of the air-conditioning control system 1A will be described below with reference to FIGS. 12 to 15.

Figure 12:
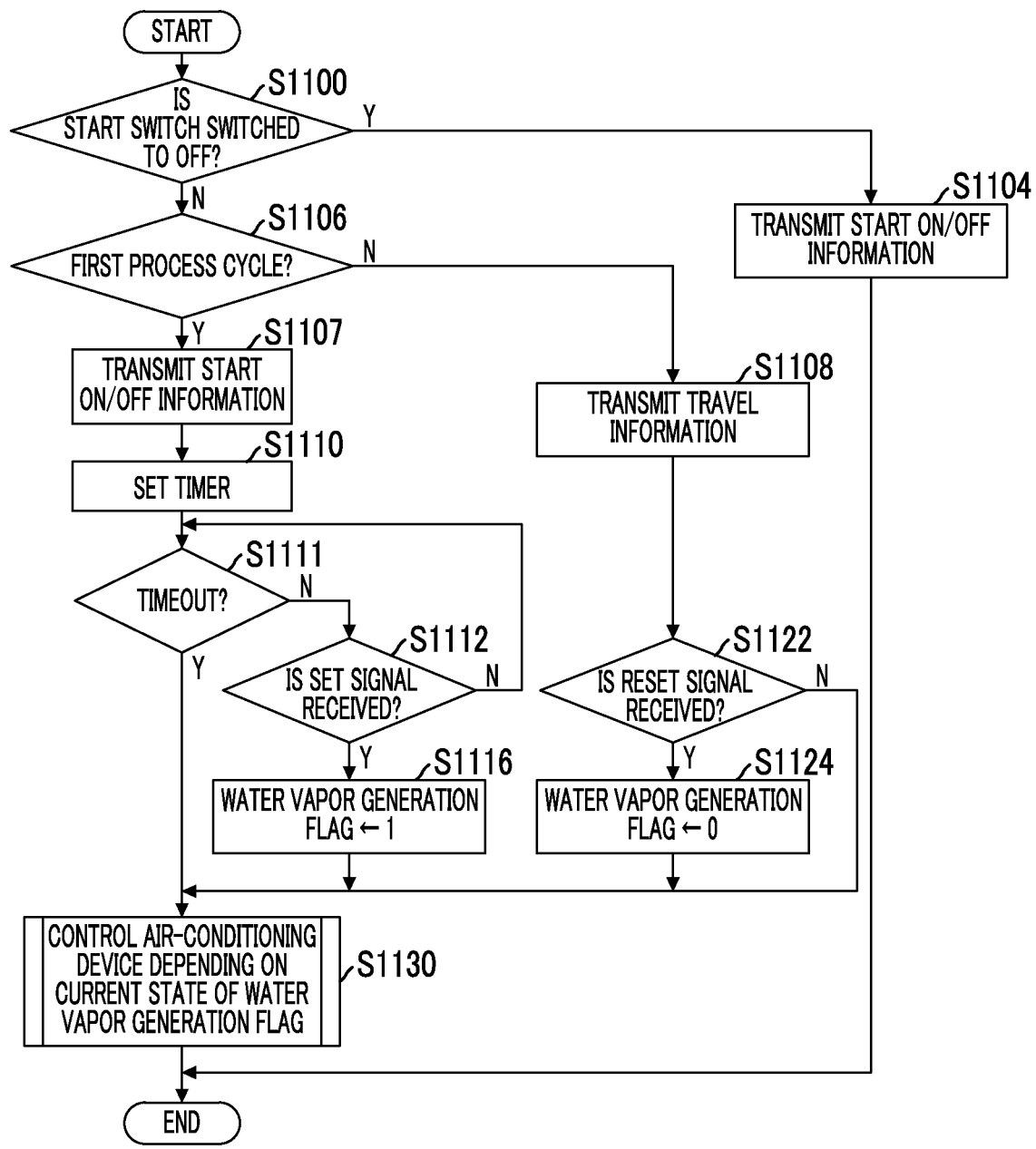
FIG. 12 is a flowchart schematically illustrating an example of a process flow which is performed by a control device.

FIG. 12 is a flowchart schematically illustrating an example of a process flow which is performed by the control device 40A of the on-board device 7. The process flow illustrated in FIG. 12 is started, for example, when the start switch is turned on, is performed with a predetermined cycle during operation of the host vehicle, and is performed when the start switch is turned off.

In Step S1100, the flag setting unit 45 determines whether the start switch is turned off. The process of Step S1104 is performed when the determination result is "YES," and the process of Step S1106 is performed otherwise (that is, when the start switch is in the ON state).

In Step S1104, the host vehicle data transmitting unit 43 transmits the start ON/OFF information (herein, start OFF information) to the server 90. When this process ends, the process flow illustrated in FIG. 12 ends until a next event in which the start switch is turned on occurs.

In Step S1106, the flag setting unit 45 determines whether the current process cycle is a first process cycle after starting. The process of Step S1107 is performed when the determination result is "YES," and the process of Step S1108 is performed otherwise.

In Step S1107, the host vehicle data transmitting unit 43 transmits the start ON/OFF information (herein, start ON information) to the server 90.

In Step S1108, the host vehicle data transmitting unit 43 transmits the travel information to the server 90.

In Step S1110, the flag setting unit 45 sets a timer. The timer times out in a predetermined time after the timer is set. The predetermined time corresponds to, for example, a time required until the host vehicle receives the set signal (for example, see Step S1112 in FIG. 12) from the server 90 after the host vehicle data transmitting unit 43 transmits the set start OFF information (for example, see Step S1107).

In Step S1111, the flag setting unit 45 determines whether the timer times out.

The process of Step S1130 is performed when the determination result is "YES," and the process of Step S1112 is performed otherwise.

In Step S1112, the flag setting unit 45 determines whether the set signal is received from the server 90. The process of Step S1116 is performed when the determination result is "YES," and the process of Step S1111 is performed again otherwise.

In Step S1116, the flag setting unit 45 sets the water vapor generation flag to "1."

In Step S1122, the flag setting unit 45 determines whether the reset signal is received from the server 90. The process of Step S1124 is performed when the determination result is "YES," and the process of Step S1130 is performed otherwise.

In Step S1124, the flag setting unit 45 resets the water vapor generation flag to "0."

In Step S1130, the control unit 46 controls the air-conditioning device 10 depending on the current state of the water vapor generation flag. This control method is the same as described above in Step S518 with reference to FIG. 5.

According to the process flow illustrated in FIG. 12, it is determined whether the set signal is received from the server 90 whenever the start switch of the host vehicle is switched from OFF to ON, and the ventilation capacity of the air-conditioning device 10 can be increased when it is determined that the set signal is received. When the reset signal from the server 90 is received by the host vehicle in a state in which the ventilation capacity of the air-conditioning device 10 has been increased in response to reception of the set signal from the server 90, it is possible to release the state in which the ventilation capacity of the air-conditioning device 10 has been increased.

Figure 13:
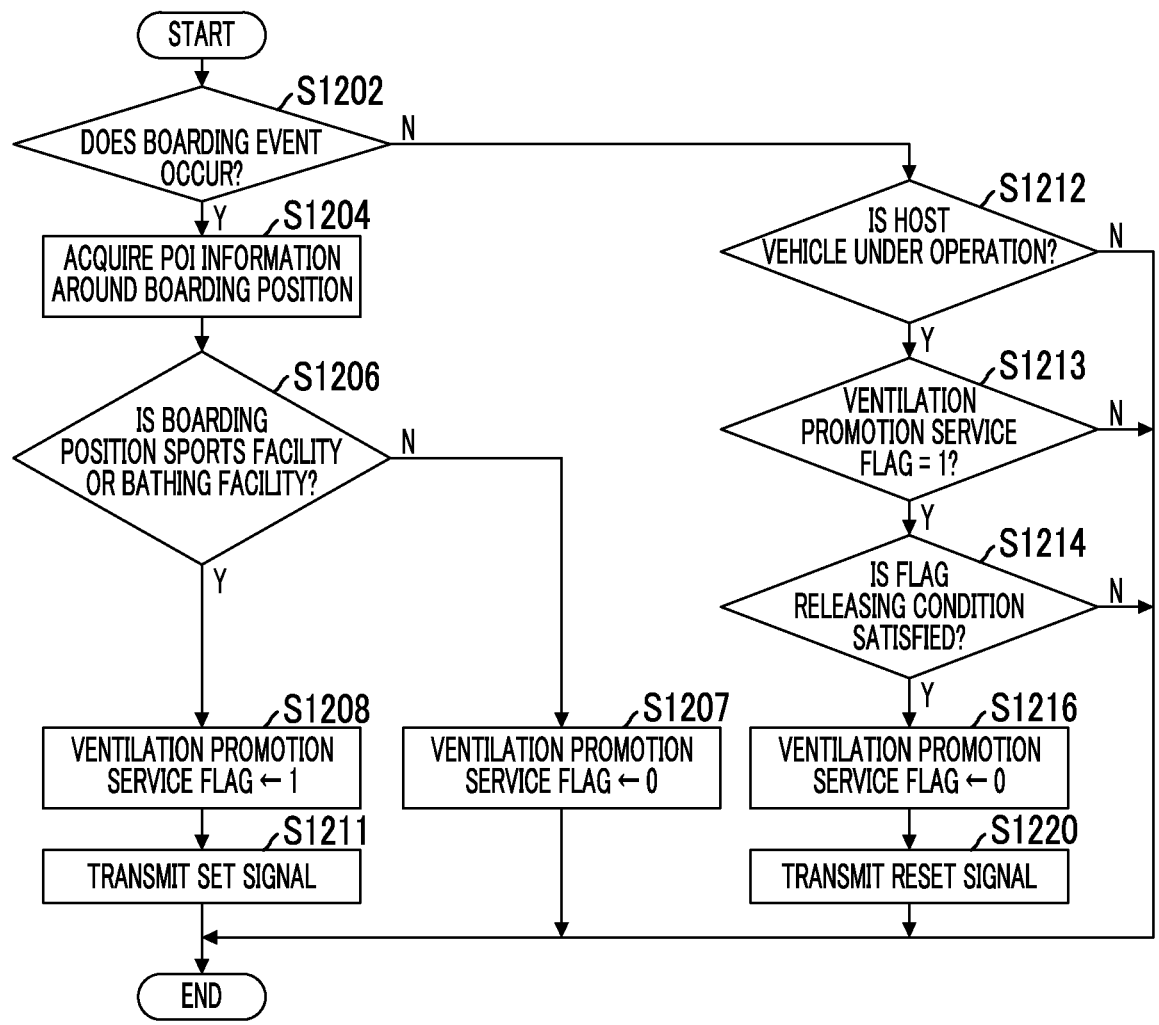
FIG. 13 is a flowchart schematically illustrating an example of a process flow which is performed by a server.

FIG. 13 is a flowchart schematically illustrating an example of a process flow which is performed by the server 90. The process flow illustrated in FIG. 13 is normally performed, for example, with a predetermined cycle.

In Step 1202, the boarding event detecting unit 91 determines whether a boarding event occurs. The determination method thereof is the same as described above. The process of Step S1204 is performed when the determination result is "YES," and the process of Step S1212 is performed otherwise.

In Step S1204, the determination unit 94 acquires POI information around the boarding position from the map database 97. In FIG. 13, for example, the determination unit 94 acquires the POI information within a predetermined distance D0 from the boarding position from the map database 97. The boarding position can be determined based on the start ON/OFF information associated with a terminal ID (a terminal ID of the host vehicle) by which the boarding event is detected.

In Step S1206, the determination unit 94 determines whether the boarding position is a sports facility or a bathing facility based on the POI information acquired in Step S1204. The determination method thereof is the same as described above in Step S506 illustrated in FIG. 5. The process of Step S1208 is performed when the determination result is "YES," and the process of Step S1207 is performed otherwise.

In Step S1207, the determination unit 94 sets the ventilation promotion service flag to "0."

In Step S1208, the determination unit 94 sets the ventilation promotion service flag to "1."

In Step S1211, the determination unit 94 transmits the set signal to the host vehicle.

In Step S1212, the determination unit 94 determines whether the host vehicle is under operation. It can be determined whether the host vehicle is under operation based on the travel information or the start ON/OFF information associated with the terminal ID (the terminal ID of the host vehicle) in which the boarding event is detected. The process of Step S1213 is performed when the determination result is "YES," and the process flow of the current cycle ends otherwise.

In Step S1213, the determination unit 94 determines whether the ventilation promotion service flag is set to "1."

The process of Step S1214 is performed when the determination result is "YES," and the process flow of the current cycle ends otherwise (that is, when the ventilation promotion service flag is set to "0").

In Step S1214, the determination unit 94 determines whether the flag releasing condition is satisfied. The process of Step S1216 is performed when the determination result is "YES," and the process flow of the current cycle ends otherwise. In FIG. 13, for example, the determination unit 94 determines that the flag releasing condition is satisfied when a duration of the state in which the ventilation promotion service flag is maintained at "1" reaches a predetermined time (a fixed value). In a modified example, the determination unit 94 may update the hyperventilation time Td as described above with reference to FIG. 6, and may determine that the flag releasing condition is satisfied when the hyperventilation time Td is greater than the predetermined threshold value Th corresponding to the index value. In this modified example, it is possible to change the duration of the state in which the ventilation capacity of the air-conditioning device 10 has been increased depending on the index value. The index value is calculated using the number of occupants as a parameter as described above. Accordingly, in this modified example, the host vehicle also transmits information of the number of occupants to the server 90, for example, when transmitting the start ON/OFF information to the server 90 (see Step S1107 in FIG. 12).

In Step S1216, the determination unit 94 resets the ventilation promotion service flag to 0."

In Step S1220, the determination unit 94 transmits the reset signal to the host vehicle.

According to the process flow illustrated in FIG. 13, the server 90 determines whether the boarding position is a sports facility or a bathing facility for each boarding event of the host vehicle. When it is determined that the boarding position is a sports facility or a bathing facility, the set signal can be transmitted from the server 90 to the host vehicle, thereby enhancing the ventilation capacity of the air-conditioning device 10 of the host vehicle. When the flag releasing condition is satisfied during operation of the host vehicle in a state in which the ventilation promotion service flag is set to "1," the water vapor generation flag of the host vehicle can be reset to "0" by transmitting the reset signal to the host vehicle.

Figure 14:
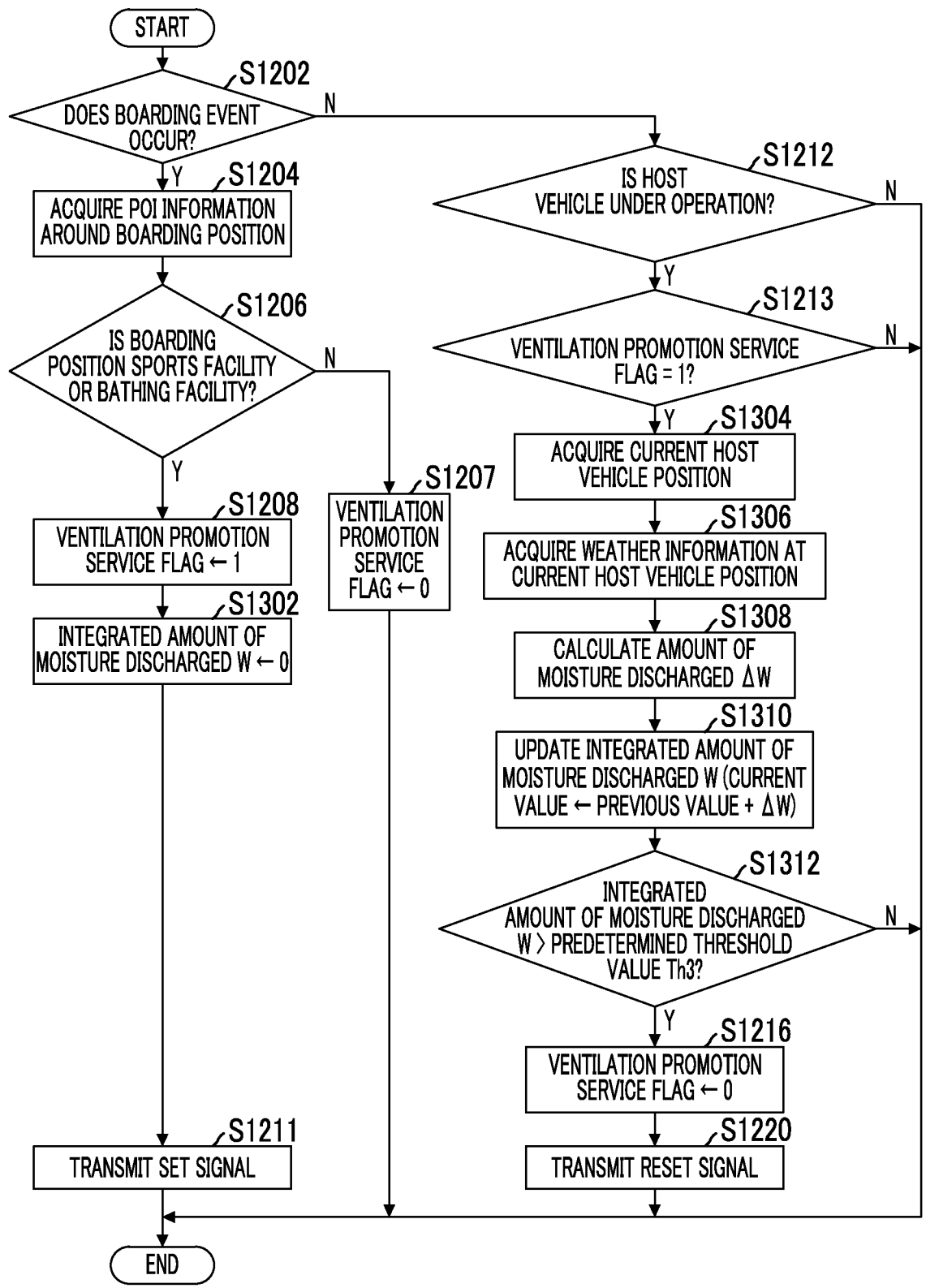
FIG. 14 is a flowchart schematically illustrating another example of the process flow which is performed by the server.

FIG. 14 is a flowchart schematically illustrating another example (an alternative of the example illustrated in FIG. 13) of the process flow which is performed by the server 90. The process flow illustrated in FIG. 14 is normally performed, for example, with a predetermined cycle.

The process flow illustrated in FIG. 14 is different from the process flow illustrated in FIG. 13, in that Steps S1302 is additionally performed between Steps S1208 and S1211 and Steps S1304 to S1312 are performed instead of Step S1214. The differences will be described below.

In FIG. 14, it is assumed that the travel information from the host vehicle data transmitting unit 43 of the host vehicle includes an operation state of the air-conditioning device 10 of the host vehicle (for example, a blower air volume) and a detected value of the air-conditioner-related sensor 86 (for example, an inside air temperature).

In Step S1302, the determination unit 94 initializes the integrated amount of moisture discharged W [g/kg] to 0. The integrated amount of moisture discharged W is an integrated value of the amount of moisture discharged from the host vehicle by ventilation of the air-conditioning device 10, as described above In Step S1304, the determination unit 94 acquires a current position of the host vehicle from the vehicle information database 98.

In Step S1306, the determination unit 94 acquires weather information indicating the weather at the current time at the current position of the host vehicle. Herein, it is assumed that the weather information includes information of outside air humidity at the current position of the host vehicle. The weather information can be acquired from, for example, a server that provides weather information.

In Step S1308, the determination unit 94, calculates an amount of moisture discharged ΔW per predetermined time Δt as an amount of moisture discharged ΔW by ventilation of the air-conditioning device 10 based on the weather information acquired in Step S1306 and the travel information in the vehicle information database 98 (such as a detected value of the air-conditioner-related sensor 86). The method of calculating the amount of moisture discharged ΔW per predetermined time Δt is the same as described above in Step S806 with reference to FIG. 9.

In Step S1310, the determination unit 94 adds the amount of moisture discharged ΔW calculated in Step S1308 to the current value (the previous value) of the integrated amount of moisture discharged W to update the integrated amount of moisture discharged W.

In Step S1312, the determination unit 94 determines whether the integrated amount of moisture discharged W is greater than a predetermined threshold value Th3. The predetermined threshold value Th3 is, for example, a fixed value which is determined in advance based on an increase due to a heavy motion (for example, an increase from the normal value in a quiet sitting state) as an increase in the amount of water vapor generated from a general person. The process of Step S1216 is performed when the determination result is "YES," and the process flow of the current cycle ends otherwise.

According to the process flow illustrated in FIG. 14, whenever the start switch of the host vehicle is switched from OFF to ON, the server 90 determines whether the boarding position is a sports facility or a bathing facility. When it is determined that the boarding position is a sports facility or a bathing facility, the set signal can be transmitted from the server 90 to the host vehicle, thereby enhancing the ventilation capacity of the air-conditioning device 10 of the host vehicle. When it is determined that the boarding position is a sports facility or a bathing facility, the integrated amount of moisture discharged W is calculated (updated) by the server 90. Then, when the server 90 determines that the integrated amount of moisture discharged W is greater than the predetermined threshold value Th3, the server 90 transmits the reset signal to the host vehicle. In this way, according to the process flow illustrated in FIG. 14, it is possible to accurately estimate the timing at which the increase in the amount of water vapor generated from an occupant (an increase due to a heavy motion) is completely discharged to the outside by the ventilation by calculating the integrated amount of moisture discharged W.

Figure 15:
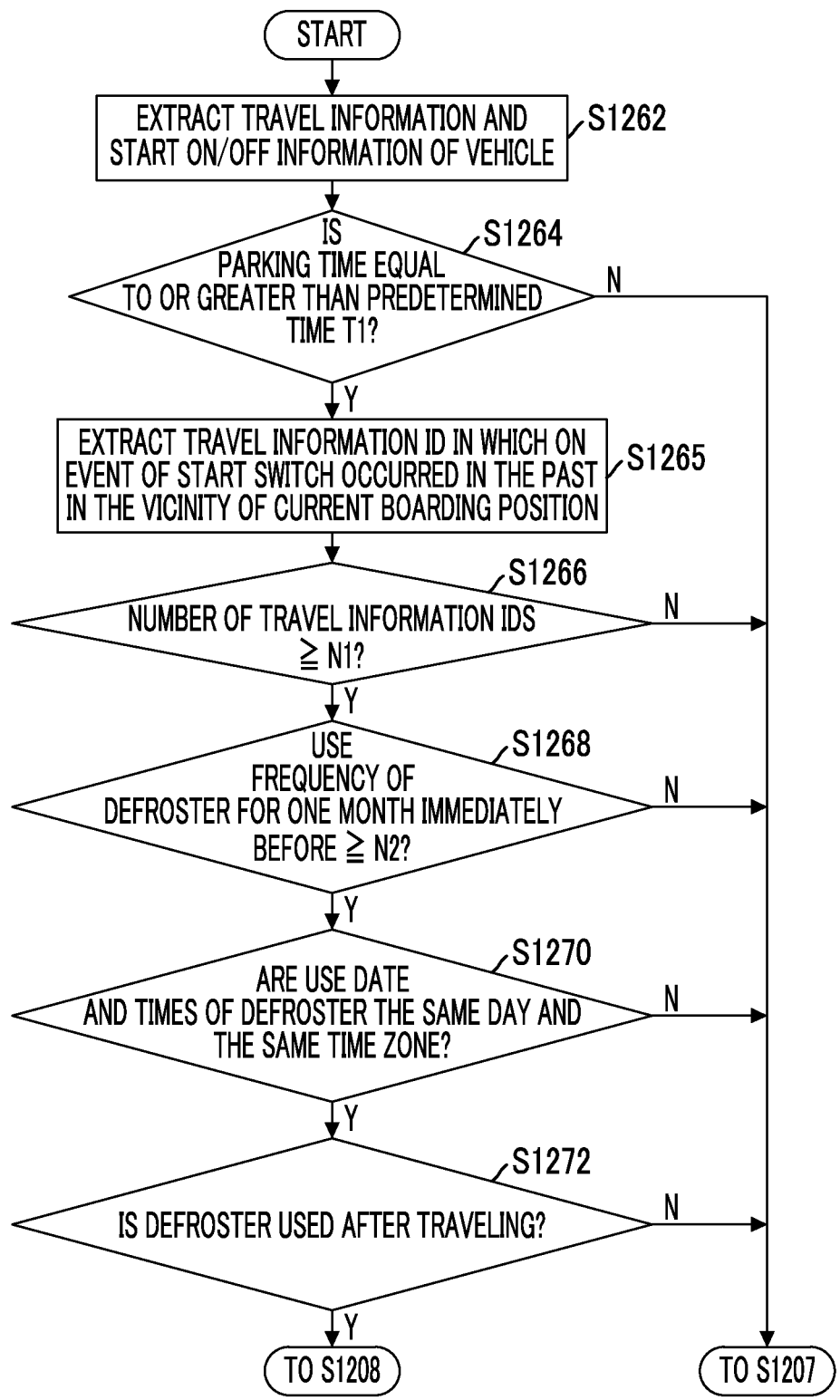
FIG. 15 is a flowchart schematically illustrating another example of a determination process flow which is performed by a determination unit of the server.

FIG. 15 is a flowchart illustrating another example of the determination process flow which is performed by the determination unit 94 of the server 90. The determination process flow illustrated in FIG. 15 can be performed, for example, instead of Steps 1204 and S1206 in FIG. 13 or 14. Alternatively, the determination process flow illustrated in FIG. 15 may be performed when the determination result of Step S1206 based on the POI information acquired in Step S1204 is "NO," and the process flow illustrated in FIG. 13 or 14 may transitions to Step S1207 or Step S1208 depending on the result of the determination process flow illustrated in FIG. 15.

In Step S1262, the determination unit 94 extracts the travel information and the start ON/OFF information of the host vehicle from the vehicle information database 98. The start ON/OFF information of the host vehicle extracted by the determination unit 94 in Step S1262 can be used as the parking history information of the host vehicle. Accordingly, in the following description, the start ON/OFF information of the host vehicle extracted by the determination unit 94 in Step S1262 is referred to as "parking history information of the host vehicle." The start ON/OFF information of the host vehicle extracted by the determination unit 94 in Step S1262 includes the defroster use history information of the host vehicle as described above.

In Step S1264, the determination unit 94 determines whether a parking time until the current boarding event is equal to or greater than a predetermined time T1 based on the parking history information of the host vehicle. The parking time until the current boarding event can be calculated based on a relationship between an OFF date and time of the start switch immediately before and an ON date and time of the start switch associated with the current boarding event. The predetermined time T1 is a minimum time in which it can be determined that a certain facility is used and is an adaptive value. The predetermined time T1 is, for example, 10 [min]. The process of Step S1265 is performed when the determination result is "YES," and the process of Step S1207 is performed otherwise.

In Step S1265, the determination unit 94 extracts a travel information ID including the host vehicle position when the start switch is turned on within a predetermined distance D0 from the boarding position associated with the current boarding event based on the parking history information of the host vehicle. That is, the determination unit 94 extracts the travel information ID in which an ON event of the start switch occurs within the predetermined distance D0 from the current boarding position. For example, regarding a certain travel information ID, when the host vehicle position when the start switch is turned on is within the predetermined distance D0 from the boarding position associated with the current boarding event, the corresponding travel information ID is extracted.

In Step S1266, the determination unit 94 determines whether the number of travel information IDs extracted in Step S1265 is equal to or greater than a predetermined number N1. The predetermined number N1 is a threshold value for a frequency in which the facility associated with the current boarding position was used in the past by the occupant of the host vehicle. The predetermined number N1 is, for example, 3 or more. This is because a facility user who uses a sports facility or a bathing facility generally tends to periodically use the facility two or more times. The process of Step S1268 is performed when the determination result is "YES," and the process of Step S1207 is performed otherwise.

In Step S1268, the determination unit 94 determines whether the use frequency of the defroster for one month immediately before is equal to or greater than a predetermined number N2 based on the defroster use history information of the host vehicle associated with the travel information ID extracted in Step S1265. This is because a facility user who uses a sports facility or a bathing facility generally tends to use the defroster during travel after the use of the facility every time. The predetermined number N2 is an adaptive value, and may be, for example, "3." The process of Step S1270 is performed when the determination result is "YES," and the process of Step S1207 is performed otherwise.

In Step S1270, the determination unit 94 determines whether use date and times of the defroster equal to or greater than the predetermined number N2 for one month immediately before are the same day and the same time zone based on the defroster use history information of the host vehicle associated with the travel information ID extracted in Step S1265. This is because a facility user who uses a sports facility or a bathing facility generally tends to use the facility two or more times on the same day and at the same time zone. The process of Step S1272 is performed when the determination result is "YES," and the process of Step S1207 is performed otherwise.

In Step S1272, the determination unit 94 determines whether the defroster which has been used equal to or greater than the predetermined number N2 for one month immediately before is a use faun in which the defroster is used after the host vehicle travels for a predetermined time T4 or more in a state in which the vehicle speed is equal to or higher than a predetermined vehicle speed V1 based on the travel information of the host vehicle associated with the travel information ID extracted in Step S1265. This is because a user generally tends to use the defroster for removing frost before the host vehicle starts traveling, but tends to use the defroster for removing cloudiness of a window after the host vehicle starts traveling. The predetermined vehicle speed V1 and the predetermined time T4 are adaptive values and are, for example, 5 [km/h] and 5 [min]. The process of Step S1208 is performed when the determination result is "YES," and the process of Step S1207 is performed otherwise.

According to the process flow illustrated in FIG. 15, it is possible to accurately determine whether a boarding position associated with a boarding event is a sports facility or a bathing facility using a general tendency of a facility user who uses the sports facility or the bathing facility. This determination method can be suitably used when there is no POI information around the boarding position.

The process flow illustrated in FIG. 15 may be performed by the determination unit 44 in the first embodiment. In this case, in the first embodiment, the control device 40 constructs a database that stores and accumulates the travel information of the host vehicle and the like and the determination unit 44 can realize the determination process flow illustrated in FIG. 15 using the database. Since determination can be performed without using POI information, this configuration is suitable when the host vehicle does not include a navigation device.

While embodiments have been described above in detail, the disclosure is not limited to the specific embodiments, but can be modified and changed in various forms within the scope described in the appended claims. All or some of the elements of the above-mentioned embodiments may be combined.

For example, in the first embodiment and the second embodiment, the point with the predetermined attribute is a point in which at least one of a sports facility and a bathing facility is present, but the disclosure is not limited thereto. For example, the point with the predetermined attribute may additionally include another point at which there is a likelihood that a motion intensity will be higher than a predetermined value (for example, a tourist facility having a long stair or a surfing spot not including a surfing facility or the like).

In FIGS. 5, 6, 9, 13, and 14, the determination unit 44 or the determination unit 94 determines whether the boarding position at the timing at which the boarding event is detected is a sports facility or a bathing facility, but the disclosure is not limited thereto. That is, the determination unit 44 or the determination unit 94 may determine whether the boarding position is a sports facility or a bathing facility before the boarding event is detected. For example, the determination unit 44 or the determination unit 94 may determine whether the boarding position associated with a boarding event which can occur in the next time is a sports facility or a bathing facility in advance when the host vehicle is parking or the start switch is turned off immediately before. This is because the host vehicle position when the start switch is turned off is likely to be equal to the host vehicle position when the start switch is turned on thereafter.

The above-mentioned embodiments can be additionally disclosed as follows.

(First Aspect) An air-conditioning control system including: an air-conditioning device disposed in a host vehicle; a determination unit disposed in the host vehicle or a server and configured to determine whether an amount of water vapor generated from an occupant is greater than a predetermined level based on an attribute of the host vehicle position (the boarding position) when a boarding event of an occupant into the host vehicle is detected; and a control unit disposed in the host vehicle and configured to control the air-conditioning device based on the determination result from the determination unit, wherein the control unit sets the ventilation capacity of the air-conditioning device to be higher when the determination unit determines that the amount of water vapor generated is greater than the predetermined level than when the determination unit does not determine that the amount of water vapor generated is greater than the predetermined level.

In the first aspect, for example, the predetermined level is equal to or greater than 1, where the amount of water vapor generated from the occupant when the occupant is in a quiet sitting state is defined as "1." For example, when it is determined that the boarding position is a point with a predetermined attribute, the determination unit determines that the amount of water vapor generated from the occupant is greater than the predetermined level. In this case, the method of determining whether the boarding position is a point with the predetermined attribute is the same as described above.

What is claimed is:

1. An air-conditioning control system mounted in a vehicle, comprising:
   an air-conditioning device configured to adjust a ventilation capacity; and
   an electronic control unit configured to
      detect a boarding event in which an occupant boards the vehicle based on an event in which a start switch of the vehicle is turned on, and
      determine whether a boarding position which is the position of the vehicle when the boarding event is detected is a point with a predetermined attribute,
   wherein the electronic control unit performs control such that the ventilation capacity of the air-conditioning device is set to be greater when it is determined that the boarding position is a point with the predetermined attribute than when it is not determined that the boarding position is a point with the predetermined attribute,
   wherein the point with the predetermined attribute is a point at which point of interest information identifies at least one of a sports facility and a bathing facility is present,
   wherein the eletronic control unit determines whether the boarding position is the point at which at least one of a sports facility and a bathing facility is present based on parking history information of the vehicle and defroster use history information of the vehicle.

2. The air-conditioning control system according to claim 1, wherein the electronic control unit determines whether the boarding position is the point with the predetermined attribute based on the point of interest information including at least one of a name, a category, and latitude and longitude.

3. The air-conditioning control system according to claim 1, wherein the electronic control unit additionally changes a duration of a state in which the ventilation capacity of the air-conditioning device is increased based on the number of occupants.

4. The air-conditioning control system according to claim 1, wherein the air-conditioning device includes an outside/inside air door and adjusts an outside air introduction rate by changing an opening level of the outside/inside air door.

5. The air-conditioning control system according to claim 1, wherein the air-conditioning device includes an outside/inside air door and a blower motor capable of adjusting an outside air introduction rate, and adjusts the ventilation capacity by changing a rotation speed of the blower motor and an opening level of the outside/inside air door.

6. The air-conditioning control system according to claim 1, wherein the point with the predetermined attribute is set based on parking history information of the vehicle and defroster use history information of the vehicle by the electronic control unit.

7. An air-conditioning control system mounted in a vehicle, comprising:
   an air-conditioning device configured to adjust a ventilation capacity; and
   an electronic control unit configured to
      detect a boarding event in which an occupant boards the vehicle based on an event in which a start switch of the vehicl is turned on, and
      determine whether a boarding position which is the position of the vehicle when the boarding event is detected is a point with a predeteremined attribute,
   wherein the electronic control unit performs control such that the ventilation capacity of the air-conditioning device is set to be greater when it is deteremined that the boarding position is a point with the predetermined attribute than when it is not determined that the boarding position is a point with the predetermined attribute,
   wherein the electronic control unit additionally changes a duration of a state in which the ventilation capacity of the air-conditioning device is increased based on the number of occupants.

8. The air-conditioning control system according to claim 7, wherein the electronic control unit determines whether the boarding position is the point with the predetermined attribute based on point of interest information including at least one of a name, a category, and latitude and longitude.

9. The air-conditioning control system according to claim 7, wherein the point with the predetermined attribute is a point at which point of interest information identifies at least one of a sports facility and a bathing facility is present.

10. The air-conditioning control system according to claim 7, wherein the air-conditioning device includes an outside/inside air door and adjusts an outside air introdution rate by changing an opening level of the outside/inside air door.

11. The air-conditioning control system according to claim 7, wherein the air-conditioning device includes an outside/inside air door and a blower motor capable of adjusting an outside air introduction rate, and adjusts the ventilation capacity by changing a rotation speed of the blower motor and an opening level of the outside/inside air door.

12. An air-conditioning control system mounted in a vehicle, comprising:
   an air-conditioning device configured to adjust a ventilation capacity; and
   an electronic control unit configured to
      detect a boarding event in which an occupant boards the vehicle based on an event in which a start switch of the vehicle is turned on, and
      determine whether a boarding position which is the positiion of the vehicle when the boarding event is detected is a point with a predetermined attribute,
   wherein the electronic control unit performs control such that the ventilation capacity of the air-conditioning device is set to be greater when it is determined that the boarding position is a point with the predetermined attribute than when it is not determined that the boarding position is a point with the predetermined attribute,
   wherein the point with the predetermined attribute is set based on parking history information of the vehicle and defroster use history information of the vehicle by the electronic control unit.

13. The air-conditioning control system according to claim 12, wherein the electronic control unit determines whether the boarding position is the point with the predetermined attribute based on point of interest information including at least one of a name, a category, and latitude and longitude.

14. The air-conditioning control system according to claim 12, wherein the point with the predetermined attribute is a point at which point of interest information identifies at least one of a sports facility and a bathing facility is present.

15. The air-conditioning control system according to claim 12, wherein the air-conditioning device includes an outside/inside air door and adjust an outside air introduction rate by changing an opening level of the outside/inside air door.

16. The air-conditioning control system according to claim 12, wherein the air-conditioning device includes an outside/inside air door and a blower motor capable of adjusting an outside air introduction rate, and adjusts the ventilation capacity by changing a rotation speed of the blower motor and an opening level of the outside/inside air door.

* * * * *

UNITED STATES PATENT AND TRADEMARK OFFICE
CERTIFICATE OF CORRECTION

PATENT NO. : 10,696,132 B2
APPLICATION NO. : 15/637387
DATED : June 30, 2020
INVENTOR(S) : Maya Inui and Masahiro Shoji Page 1 of 1

It is certified that error appears in the above-identified patent and that said Letters Patent is hereby corrected as shown below:

In the Specification

In Column 24, Line(s) 20, delete "faun" and insert --form--, therefor.

In the Claims

In Column 26, Line(s) 5, Claim 1, delete "eletronic" and insert --electronic--, therefor.

In Column 26, Line(s) 43, Claim 7, delete "vehicl" and insert --vehicle--, therefor.

In Column 28, Line(s) 17, Claim 15, delete "adjust" and insert --adjusts--, therefor.

Signed and Sealed this
First Day of September, 2020

Andrei Iancu
*Director of the United States Patent and Trademark Office*